(12) United States Patent
Kimura et al.

(10) Patent No.: US 12,442,785 B2
(45) Date of Patent: Oct. 14, 2025

(54) MEMS GAS SENSOR MOUNT BODY

(71) Applicant: NISSHA CO., LTD., Kyoto (JP)

(72) Inventors: Teppei Kimura, Kyoto (JP); Hiroaki Suzuki, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 831 days.

(21) Appl. No.: 17/440,153

(22) PCT Filed: Mar. 5, 2020

(86) PCT No.: PCT/JP2020/009383
§ 371 (c)(1),
(2) Date: Sep. 16, 2021

(87) PCT Pub. No.: WO2020/195673
PCT Pub. Date: Oct. 1, 2020

(65) Prior Publication Data
US 2022/0146445 A1 May 12, 2022

(30) Foreign Application Priority Data

Mar. 27, 2019 (JP) ................ 2019-059562
Mar. 27, 2019 (JP) ................ 2019-059563
Mar. 27, 2019 (JP) ................ 2019-059564

(51) Int. Cl.
G01N 27/12 (2006.01)
(52) U.S. Cl.
CPC ................ *G01N 27/128* (2013.01)
(58) Field of Classification Search
CPC ................................ G01N 27/128
See application file for complete search history.

(56) References Cited

U.S. PATENT DOCUMENTS

2011/0180893 A1* 7/2011 Minegishi ........ H01L 27/14618
257/E31.127

FOREIGN PATENT DOCUMENTS

| JP | 2009216543 A | 9/2009 |
| JP | 2012-78089 A | 4/2012 |
| JP | 2012098233 A | 5/2012 |
| KR | 20180085186 A | 7/2018 |
| WO | 2009145373 A1 | 12/2009 |

OTHER PUBLICATIONS

English Translation of KR 10-2018-0085186 (Year: 2018).*
International Search Report in PCT/JP2020/009383 dated Jun. 9, 2020.

* cited by examiner

*Primary Examiner* — Alexander A Mercado
(74) *Attorney, Agent, or Firm* — Global IP Counselors, LLP

(57) ABSTRACT

A MEMS gas sensor mount body includes a MEMS gas sensor chip and a printed circuit board. The MEMS gas sensor chip includes a base having a cavity, an insulating film having an opening portion, a gas sensing unit, and a plurality of pads. The printed circuit board includes a gas introduction path, and a plurality of connection terminals. The MEMS gas sensor chip is mounted on the printed circuit board to cover the opening portion, with the cavity and the gas introduction path overlapping in plan view, and with the plurality of pads electrically connected to the plurality of connection terminals. The gas introduction path is provided on the printed circuit board in a region other than a region on which the gas sensing unit is positioned.

6 Claims, 22 Drawing Sheets

B-B CROSS-SECTIONAL VIEW

A-A CROSS-SECTIONAL VIEW

MEMS GAS SENSOR MOUNT BODY

CROSS REFERENCES TO RELATED APPLICATIONS

This application is a U.S. National stage of International Application No. PCT/JP2020/009383, filed on Mar. 5, 2020. This application claims priority to Japanese Patent Application Nos. 2019-059562 filed on Mar. 27, 2019, 2019-059563 filed on Mar. 27, 2019, and 2019-059564 filed on Mar. 27, 2019 with Japan Patent Office. The entire disclosures of Japanese Patent Application Nos. 2019-059562, 2019-059563 and 2019-059564 are hereby incorporated herein by reference.

BACKGROUND

Field of the Invention

The present disclosure relates to a MEMS gas sensor mount body.

Background Information

JP 2009-216543 A (Patent Document 1) discloses an example of a configuration in which a MEMS gas sensor chip is mounted on a mount substrate (see FIGS. 7A and 7B). A MEMS gas sensor mount body 100 of this configuration has a MEMS gas sensor chip 200 mounted on a mount substrate 300 provided with an opening portion 320, and has four sides and corners covered with a cap 400 (see FIG. 7B). The MEMS gas sensor chip 200 includes: a base 210 having a through hole 211, an insulating film 220 formed to cover the through hole, a gas sensitive material 230 positioned on the insulating film and above the through hole, and a plurality of pads 240 positioned in a region on the insulating film not above the through hole and connected to the gas sensitive material (see FIG. 7A). The pads 240 and connection terminals 310 provided on the mount substrate are electrically connected to each other, with the gas sensitive material 230 positioned in the opening portion 320 of the mount substrate. Such a MEMS gas sensor mount body is covered by the cap, so that debris and oil can be prevented from adhering to the gas sensitive material.

SUMMARY

In the known MEMS gas sensor mount body, the insulating film in a region where the gas sensitive material is provided is very thin because the insulating film is formed to cover the through hole of the base. In view of this, the cap has to be provided to prevent a damage on the insulating film or the like, but this imposes a problem in that thinning of the MEMS gas sensor mount body is limited.

An object of the present disclosure is to solve the problem described above, and an object of the present disclosure is to provide a MEMS gas sensor mount body that requires no cap or the like for protecting the MEMS gas sensor chip, and can be thinned easily.

Some aspects will be described below as means to solve the problems.

A MEMS gas sensor mount body of the present disclosure includes a MEMS gas sensor chip and a mount substrate. The MEMS gas sensor chip includes: a base having a cavity; an insulating film that is provided to cover the cavity and has an opening portion connected to the cavity; a gas sensing unit positioned above the cavity; and a plurality of pads that are positioned in a region on the insulating film not above the cavity and are connected to the gas sensing unit. The mount substrate includes a plurality of connection terminals and a plurality of micropores. The pads and the connection terminals are electrically connected to each other with the gas sensing unit positioned in a region in which the micropores are formed.

The region of the mount substrate where the micropores are formed may be thinner than a region other than the region where the micropores are formed.

A MEMS gas sensor mount body of the present disclosure includes a MEMS gas sensor chip and a flexible printed wiring board. The MEMS gas sensor chip includes: a base having a cavity; an insulating film that is provided to cover the cavity and has an opening portion connected to the cavity; a gas sensing unit positioned above the cavity; and a plurality of pads that are positioned in a region on the insulating film not above the cavity and are connected to the gas sensing unit. The flexible printed wiring board includes: a base film including a through hole; a plurality of connection terminals provided on the base film; and a metal mesh portion provided on the base film to cover the through hole and insulated from the connection terminals. The pads and the connection terminals are electrically connected to each other with the gas sensing unit positioned in a region in which the metal mesh portion is formed.

A MEMS gas sensor mount body of the present disclosure includes a MEMS gas sensor chip and a mount substrate. The MEMS gas sensor chip includes: a base having a cavity; an insulating film that is provided to cover the cavity and has an opening portion connected to the cavity; a gas sensing unit positioned above the cavity; and a plurality of pads that are positioned in a region on the insulating film not above the cavity and are connected to the gas sensing unit. The mount substrate includes a plurality of connection terminals and at least one groove. The pads and the connection terminals are electrically connected to each other with the cavity and the groove overlapping in plan view.

The mount substrate may further include a recessed portion in a region where the gas sensing unit is positioned, and the recessed portion may be connected to the groove.

The peripheries of connection portions between the pads and the connection terminals may be sealed by resin.

A MEMS gas sensor mount body of the present disclosure includes a MEMS gas sensor chip and a printed circuit board. The MEMS gas sensor chip includes: a base having a cavity; an insulating film that is provided on the base to cover the cavity and has an opening portion connected to the cavity; a gas sensing unit provided on a region of the insulating film above the cavity; and a plurality of pads that are provided on a region on the insulating film not above the cavity and are connected to the gas sensing unit. The printed circuit board includes a gas introduction path and a plurality of connection terminals. The MEMS gas sensor chip is mounted on the printed circuit board, with the cavity and the gas introduction path overlapping in plan view, and with the plurality of pads electrically connected to the plurality of connection terminals.

The printed circuit board may further include a metal mesh portion that is insulated from the plurality of connection terminals and includes a plurality of metal wires provided on the printed circuit board, and the plurality of metal wires may partially cover the plurality of micropores.

A MEMS gas sensor mount body of the present disclosure requires no cap or the like for protecting the MEMS gas sensor chip, and can be easily thinned.

DETAILED DESCRIPTION OF EMBODIMENTS

Figure 1A:
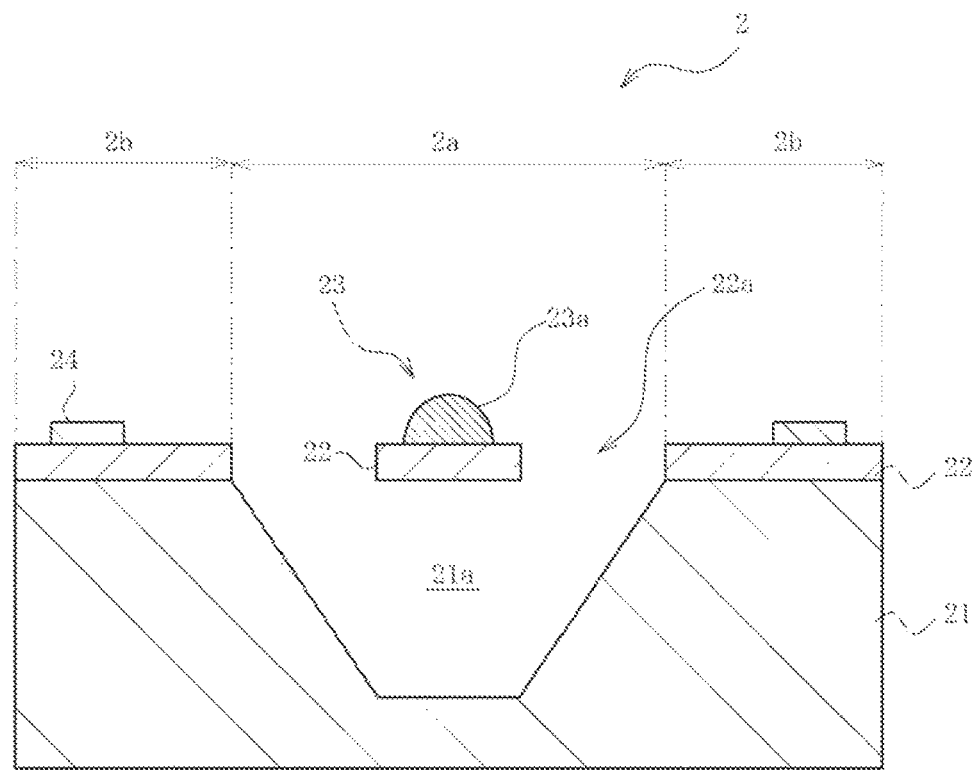
FIG. 1A is a schematic cross-sectional view illustrating an example of a MEMS gas sensor chip.

Hereinafter, an example of an embodiment of a MEMS gas sensor mount body of the present disclosure will be described with reference to the drawings.

A MEMS gas sensor mount body 1 of the present disclosure includes a MEMS gas sensor chip 2 and a mount substrate 3. The MEMS gas sensor chip 2 includes: a base 21 having a cavity 21a; an insulating film 22 that is provided to cover the cavity and has an opening portion 22a connected to the cavity; a gas sensing unit 23 positioned above the cavity; and a plurality of pads 24 that are positioned in a region 2b on the insulating film not above the cavity and are connected to the gas sensing unit. The mount substrate 3 includes a plurality of connection terminals 31 and a plurality of micropores 32. The pads 24 and the connection terminals 31 are electrically connected to each other with the gas sensing unit positioned in a region 3a in which the micropores are formed (see FIGS. 1A and 1B).

The MEMS gas sensor chip 2 includes: a base 21 having a cavity 21a; an insulating film 22 that is provided to cover the cavity and has an opening portion 22a connected to the cavity; a gas sensing unit 23 positioned above the cavity; and a plurality of pads 24 that are positioned in a region 2b on the insulating film not above the cavity and are connected to the gas sensing unit (see FIG. 1A).

Figure 2A:
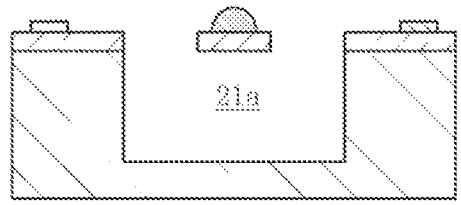
FIG. 2A is a schematic cross-sectional view illustrating another example of the MEMS gas sensor chip.
Figure 2C:
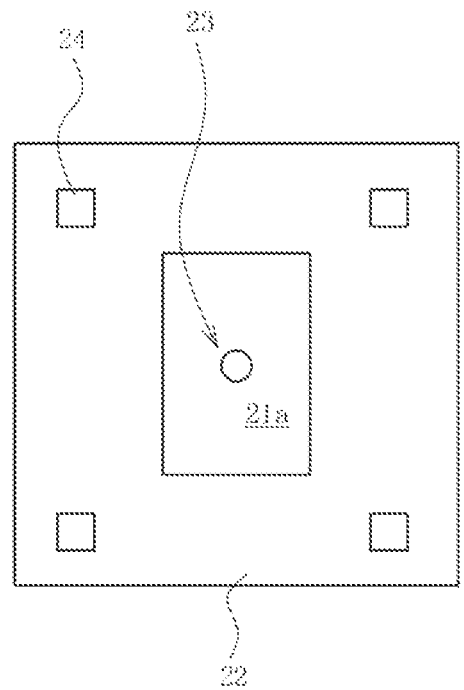
FIGS. 2B, 2C and 2D are schematic plan views illustrating an example of the shape of a cavity of the MEMS gas sensor chip.
Figure 2B:
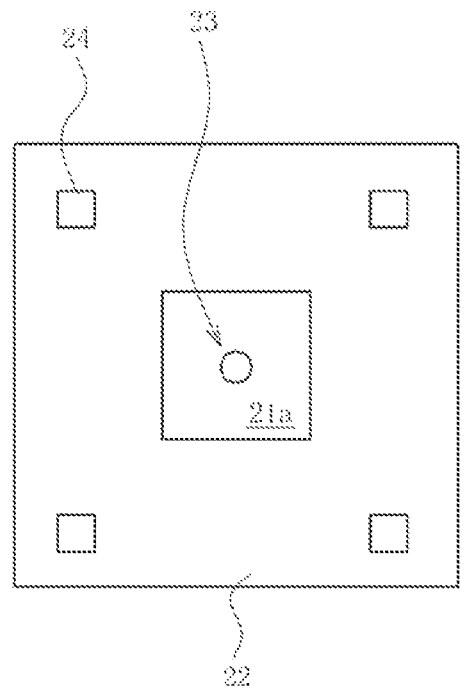
Figure 2D:
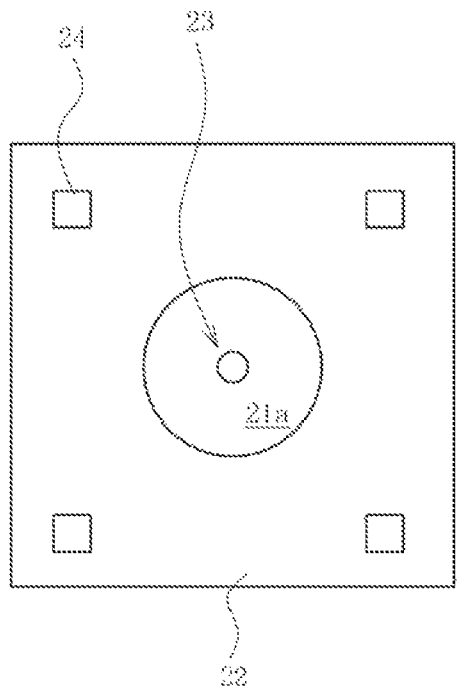

The base 21 is an insulator, examples of materials usable therefor include silicon, sapphire glass, quartz glass, ceramic wafer, silicon carbide (SiC), and the like. The thickness of the base 21 may be 100 to 800 μm for example. The base 21 is provided with the cavity 21a. The cavity 21a has a quadrangular pyramid shape having a transverse cross-sectional area decreasing from one surface of the base to the other surface. Note that the cavity 21a may have a vertical hole shape (see FIG. 2A) and that have a square, a rectangle, or a circular planer shape (see FIGS. 2B to 2D).

The insulating film 22 is formed to cover the cavity 21a of the base 21. Thus, the insulating film in the region 2a above the cavity has a thin film shape. In addition, the insulating film has the opening portion 22a that is connected to the cavity 21a. The opening portion 22a has, for example, a shape such as that illustrated in FIG. 3 in plan view, and is provided in the insulating film formed in the region 2a above the cavity. The thickness of the insulating film may be 0.1 to 10 μm for example. Examples of materials that can be used for the insulating film 22 include $SiO_2$, $Si_3N_4$, $SiN_xO_y$, SiC, TiN, $Ta_2O_5$, $Al_2O_3$, MgO, polyimide, epoxy resin, a multilayer film formed by combining these, and the like.

The gas sensing unit 23 is positioned in the region 2a above the cavity. The gas sensing unit 23 includes: the insulating film 22 formed in the region 2a above the cavity; a detection electrode portion and a heater unit (not illustrated) layered inside the insulating film 22; and a gas sensitive material 23a covering the detection electrode portion. The detection electrode portion functions to detect a change in a resistance value within the MEMS gas sensor chip 2 when gas to be detected adheres to the gas sensitive material 23a. The heater unit serves to heat the gas sensitive material 23a and functions to facilitate reaction of the gas to be detected and the gas sensitive material 23a and to rapidly diffuse the absorbed gas and moisture after the reaction. The gas sensitive material 23a includes a property sensitive (reacting) to gas to be detected. Specifically, a resistance value of the gas sensitive material 23a changes in accordance with a change in concentration of the gas to be detected. The thickness of the gas sensitive material 23a may be 0.1 to 100 µm for example. The material usable for the gas sensitive material 23a is, for example, $SnO_2$, $WO_3$, ZnO, NiO, CuO, FeO, or $In_2O_3$. A method usable for forming the gas sensitive material 23a is, for example, screen printing, dispenser or ink jet application, or sputtering.

Figure 3:
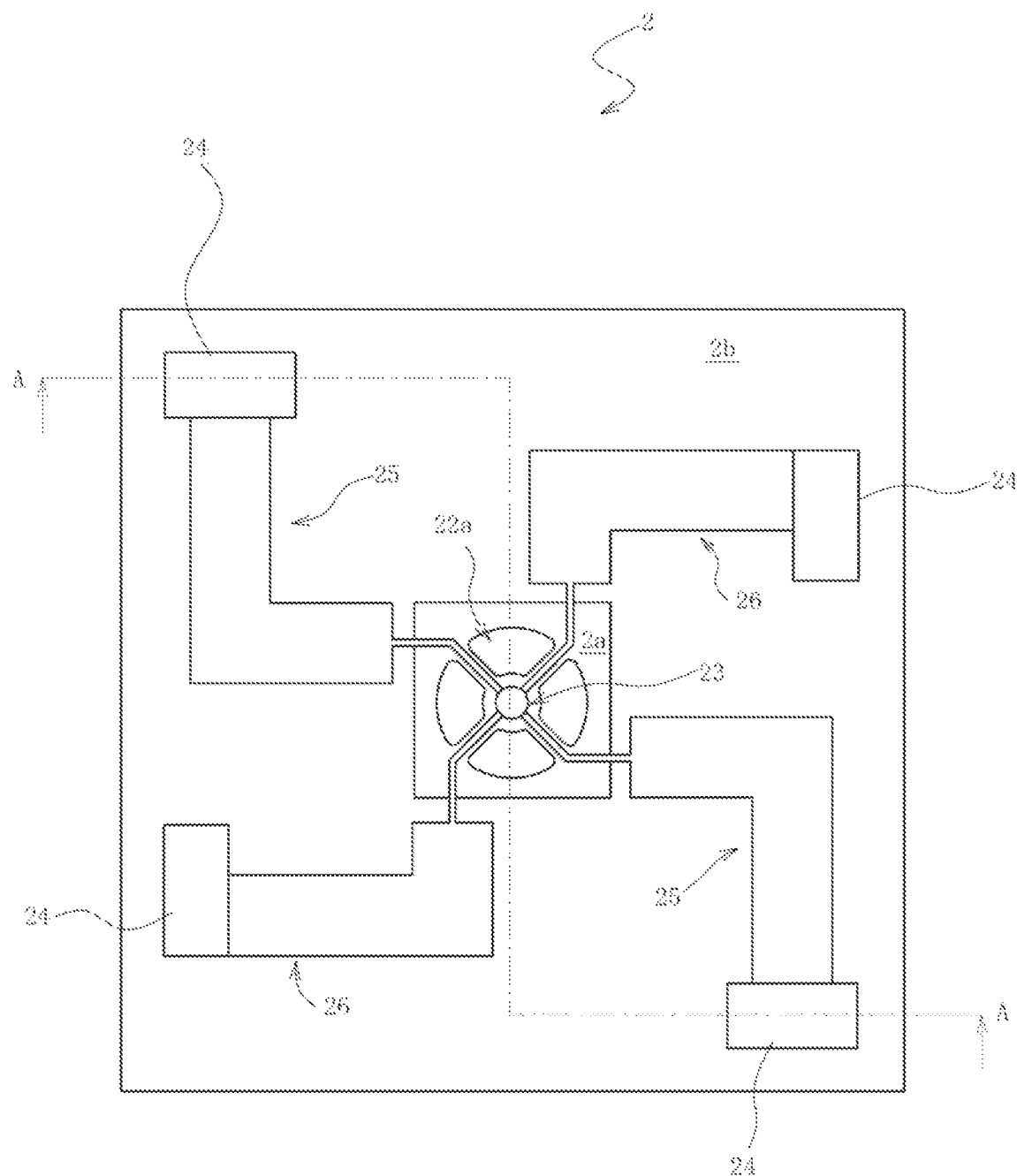
FIG. 3 is a schematic plan view illustrating an example of a MEMS gas sensor chip.

The pads 24 are positioned in the region 2b on the insulating film 22 not above the cavity. As illustrated in FIG. 3, four pads 24 are formed, for example. Two of the four pads are connected to an electrode wiring pattern 25 and the remaining two are connected to a heater wiring pattern 26. The electrode wiring pattern 25 is connected to the detection electrode portion of the gas sensing unit 23, and the heater wiring pattern 26 is connected to the heater unit of the gas sensing unit 23.

Figure 1B:
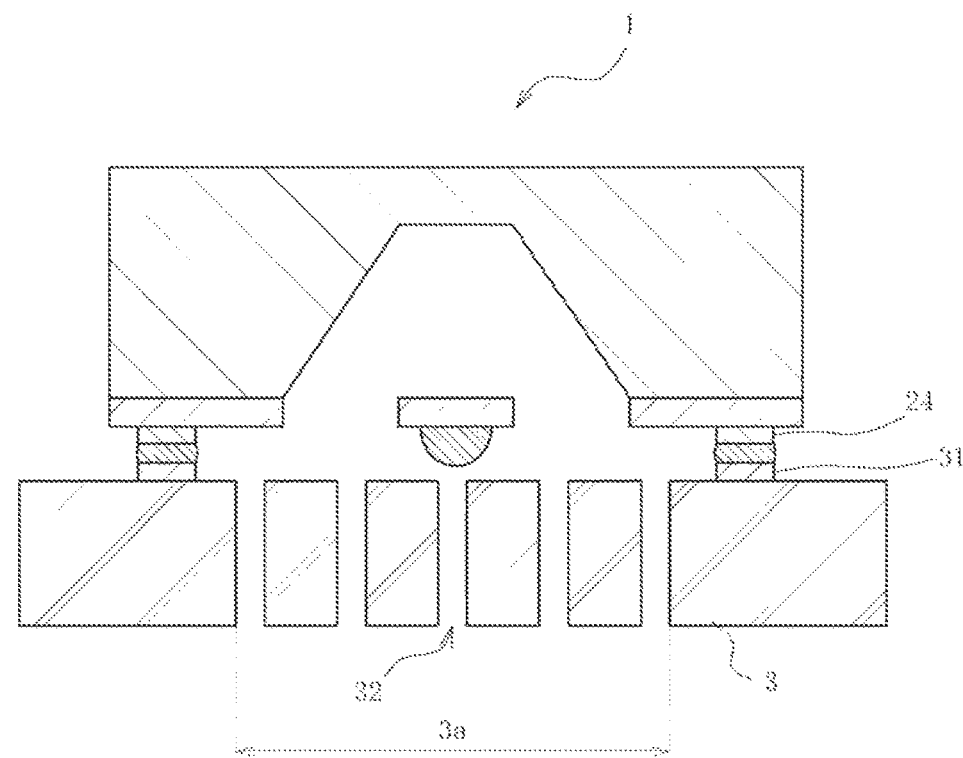
FIG. 1B is a schematic cross-sectional view illustrating an example of a MEMS gas sensor mount body.
Figure 4A:
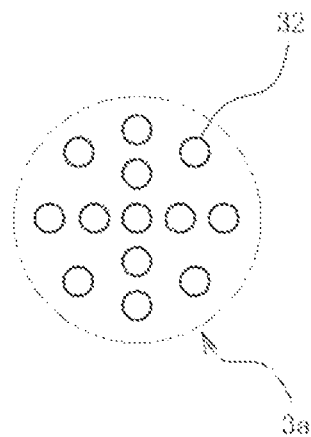
FIGS. 4A, 4B, 4C, 4D, 4E and 4F are schematic plan views illustrating an example of the shape of a micropore formed region of a mount substrate.
Figure 4D:
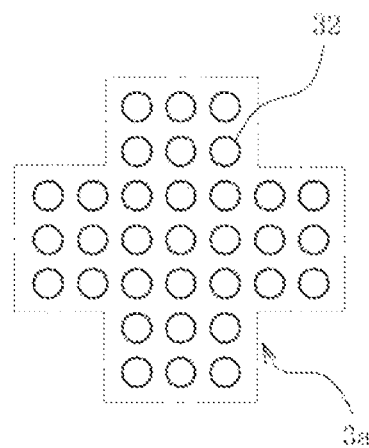
Figure 4B:
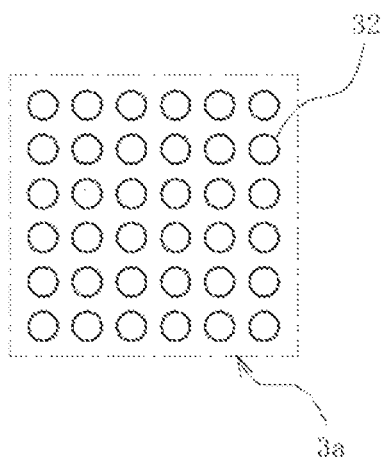
Figure 4E:
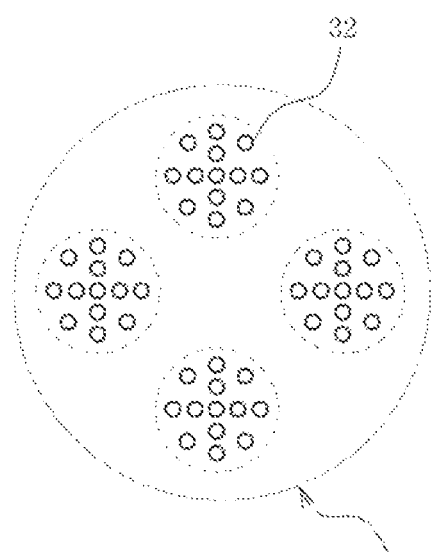
Figure 4C:
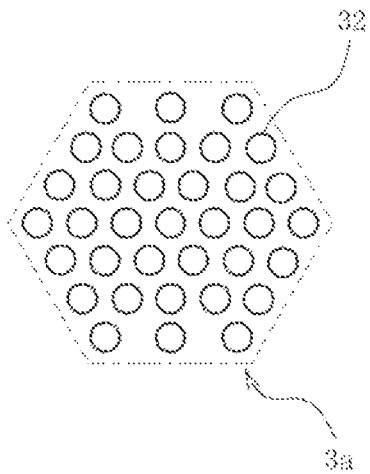
Figure 4F:
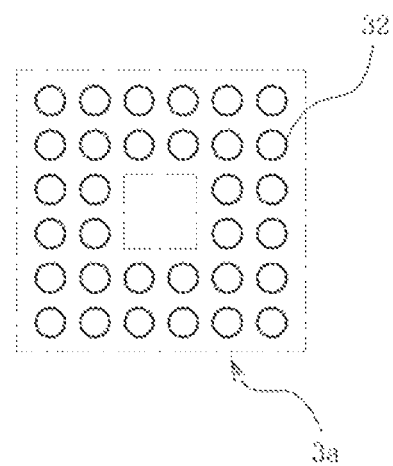

The mount substrate 3 includes the plurality of connection terminals 31 and the plurality of micropores 32 (see FIG. 1B). A printed circuit board can be used as the mount substrate 3, for example. Examples of the type of substrates usable for the printed circuit board include a paper phenol substrate, an epoxy substrate, a glass composite substrate, a glass epoxy substrate, a glass polyimide substrate, a fluorine substrate, a glass PPO substrate, a metal substrate, a ceramic substrate, and the like. The number of connection terminals 31 is the same as or more than the number of the pads, because the connection terminals 31 need to be electrically connected to the pads 24, when the MEMS gas sensor chip 2 is mounted. The plurality of micropores 32 can be formed by using, for example, a drill. The diameter of the micropores 32 may be, for example, 200 µm or less. The size of the micropore formed region 3a may be the same as or larger/smaller than the size of the cavity 21a in plan view. The plurality of micropores 32 may form a shape such as a circle, polygon, cross, or the like for example (see FIGS. 4A to 4D). Furthermore, as illustrated in FIG. 4E, the micropores 32 arranged to form circular shapes may be formed in, for example, the micropore formed region 3a of a circular shape, for example. Furthermore, as illustrated in FIG. 4F, the micropores 32 need not be formed in the center of the micropore formed region 3a. In this case, the gas sensing unit 23 of the MEMS gas sensor chip 2 corresponds to the region where the micropores are not formed.

When being mounted on the mount substrate 3, the MEMS gas sensor chip 2 is disposed so that the gas sensing unit 23 of the MEMS gas sensor chip 2 is positioned in the region 3a of the mount substrate 3 where the micropores 32 are formed (see FIG. 1B). Then, the pads 24 and the connection terminals 31 are electrically connected to each other. A method for the connection can be a known method. For example, pressure contact methods and ultrasonic bonding methods using gold bumps, anisotropic bonding methods using gold bumps and anisotropic conductive adhesives, solder bump bonding methods using solder bumps, and the like may be used.

Figure 7A:
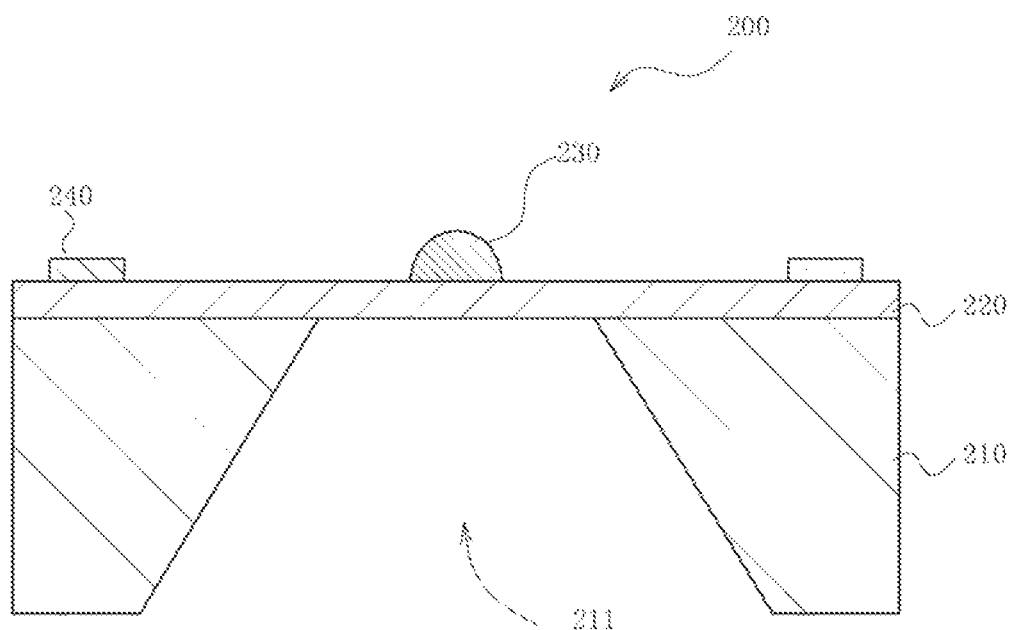
FIGS. 7A and 7B are schematic cross-sectional views illustrating a known MEMS gas sensor mount body.
Figure 7B:
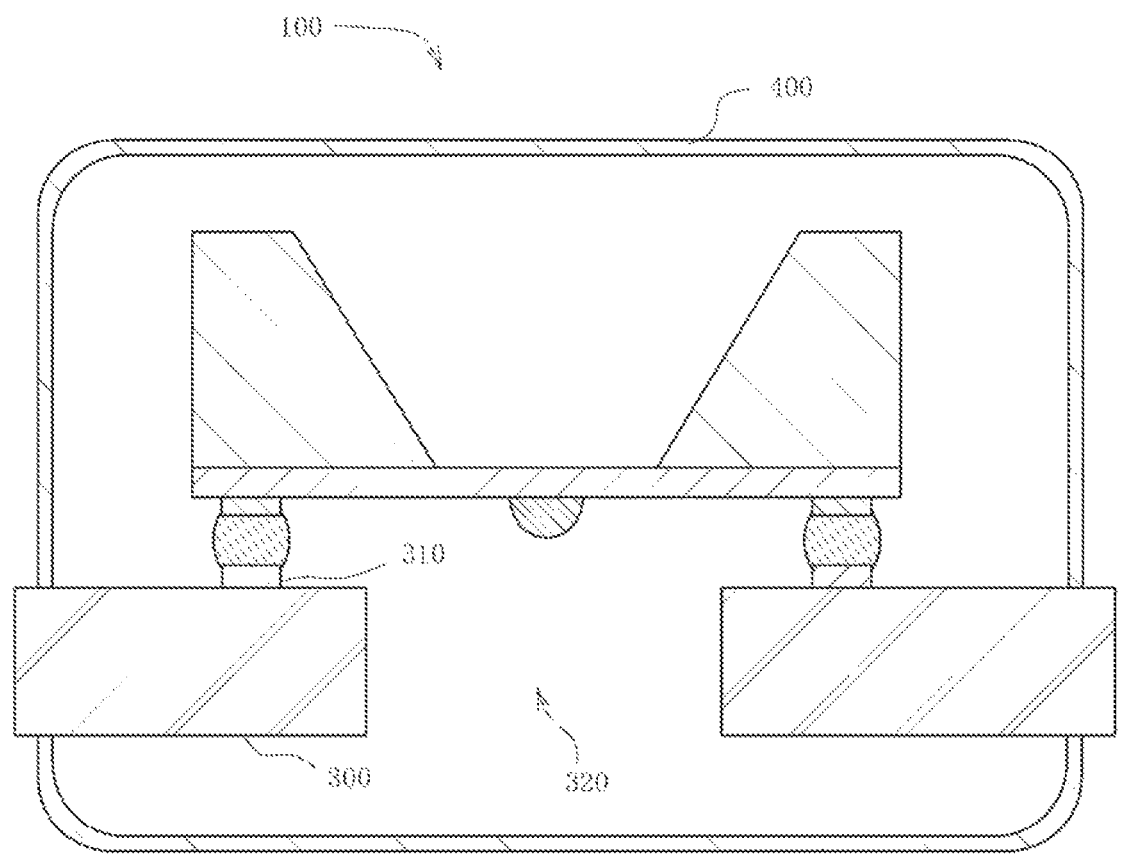

In the known MEMS gas sensor mount body 100, the through hole 211 of the base 210 is positioned above the insulating film 220 provided with the gas sensitive material 230 of the MEMS gas sensor chip 200 (see FIG. 7B). Thus, the insulating film 220 is exposed. The cap 400 is required for protecting the thin film shaped insulating film 220, and this results in an increased thickness of the MEMS gas sensor mount body 100. On the other hand, the MEMS gas sensor mount body 1 of the present disclosure has the MEMS gas sensor chip 2 mounted on the mount substrate 3 using what is known as a flip-chip mounting method as in the case of the known mount body. In the MEMS gas sensor chip 2, the base 21 is positioned above the thin film shaped insulating film 22 provided with the gas sensitive material 23a (see FIG. 1B). Because the thin film shaped insulating film 22 is protected by the base 21 positioned thereabove, the cap as in the known configuration is no longer required. Accordingly, the MEMS gas sensor mount body 1 can be easily thinned. Furthermore, the plurality of micropores 32 formed in the mount substrate 3 can prevent debris, oil, and the like from adhering to the gas sensitive material 23a.

Figure 5:
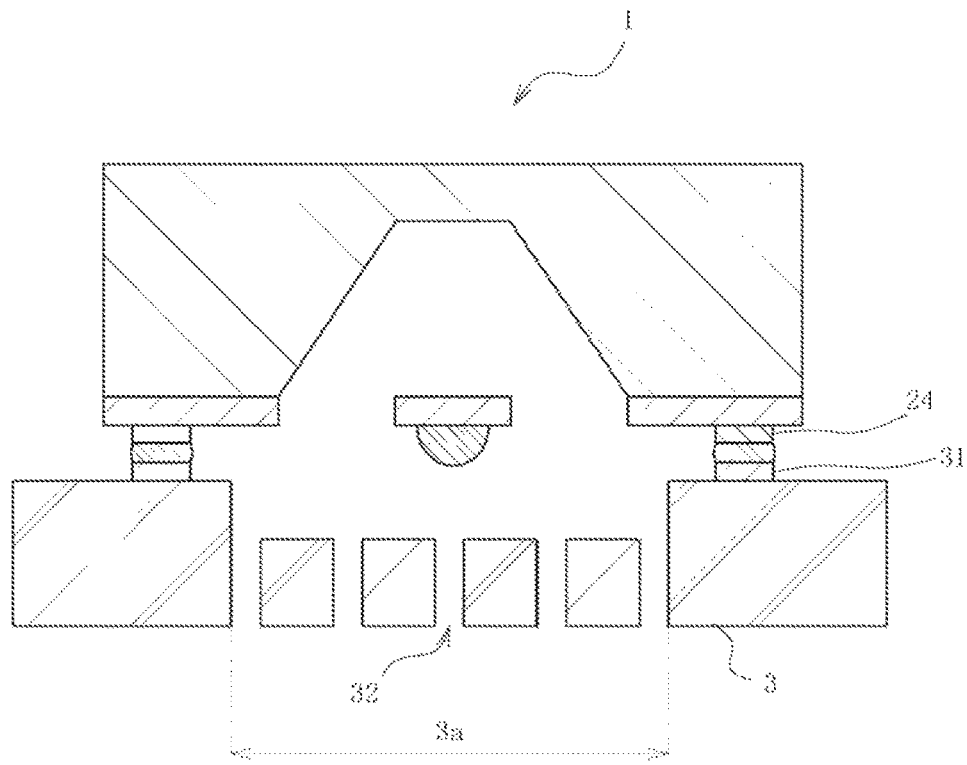
FIG. 5 is a schematic cross-sectional view illustrating another example of the MEMS gas sensor mount body.

In the embodiment described above, the mount substrate 3 has a uniform thickness, but this should not be construed in a limiting sense. Specifically, the thickness of the region 3a of the mount substrate 3 where the micropores 32 are formed may be smaller than that of the regions other than the micropore formed region 3a (see FIG. 5). The micropore formed region 3a may be thinned through a countersinking process using an endmill or the like for example. With such a configuration, a large space can be secured around the gas sensing unit 23, to facilitate the passage of the gas to be detected. Thus, detection sensitivity can be improved.

Figure 6:
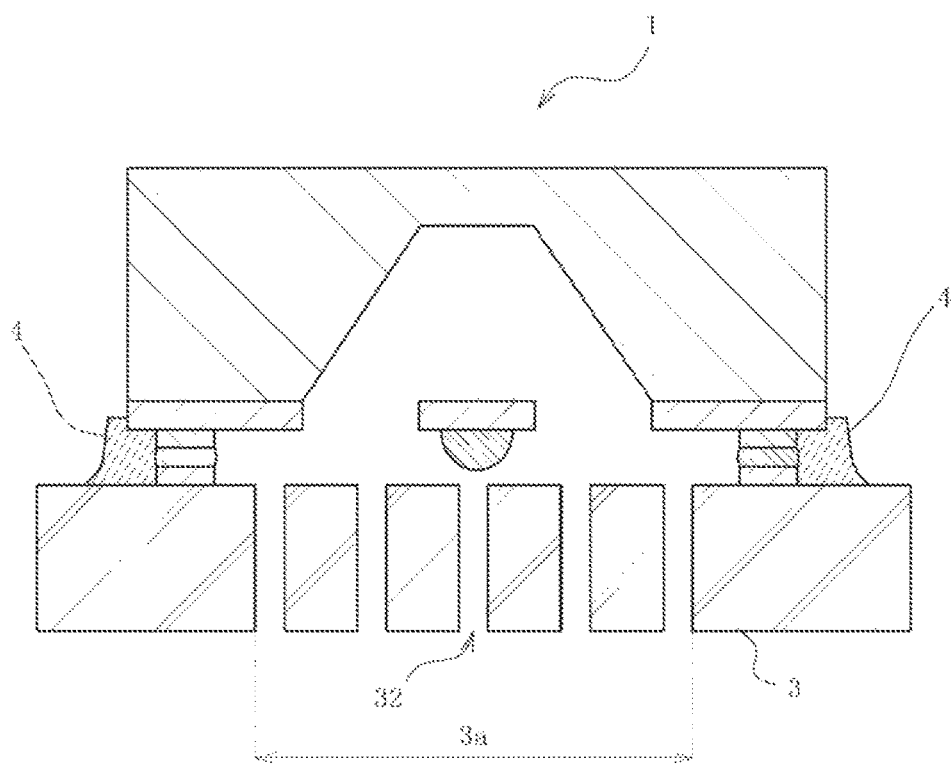
FIG. 6 is a schematic cross-sectional view illustrating another example of the MEMS gas sensor mount body.

Furthermore, the periphery of the connection portion between the pads 24 of the MEMS gas sensor chip 2 and the connection terminals 31 of the mount substrate 3 may be sealed by resin 4 (see FIG. 6). The resin 4 is preferably a liquid curable resin. The resin 4 is in close contact with the outer circumferential portion of the MEMS gas sensor chip 2 and with the mount substrate 3. With such a configuration, the MEMS gas sensor chip 2 can be firmly fixed to the mount substrate 3.

Figure 8A:
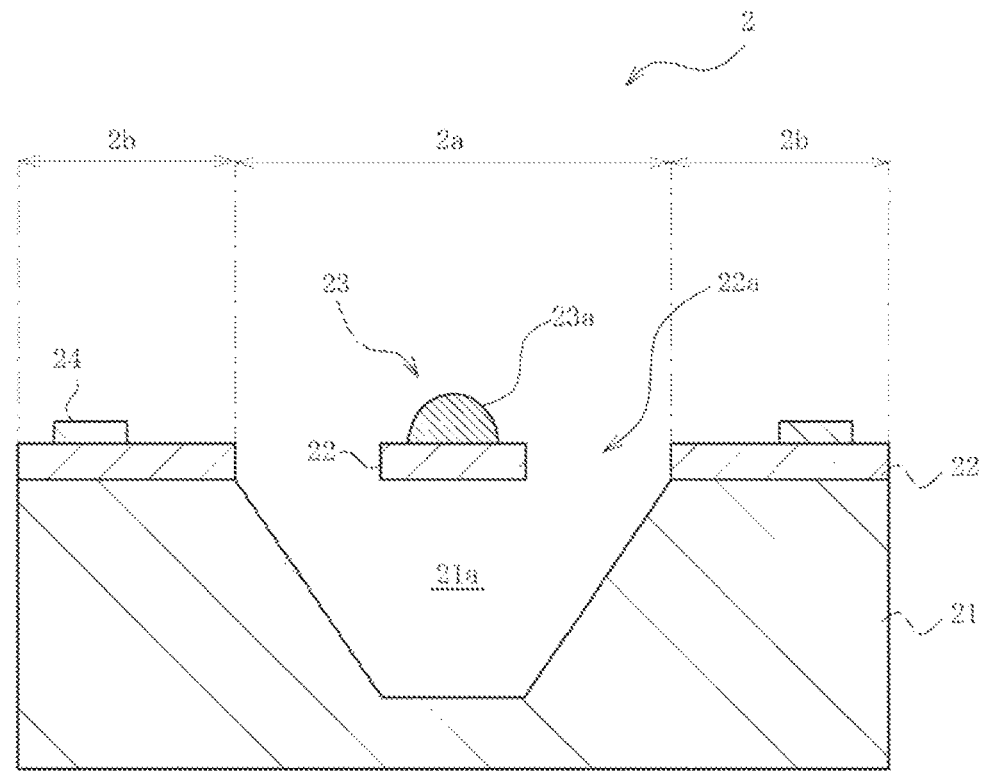
FIG. 8A is a schematic cross-sectional view illustrating an example of a MEMS gas sensor chip (A-A cross sectional view of FIG. 3).

A MEMS gas sensor mount body 1 of the present disclosure includes a MEMS gas sensor chip 2 and a flexible printed wiring board 5. The MEMS gas sensor chip 2 includes: a base 21 having a cavity 21a; an insulating film 22 that is provided to cover the cavity and has an opening portion 22a connected to the cavity; a gas sensing unit 23 positioned above the cavity; and a plurality of pads 24 that are positioned in a region 2b on the insulating film not above the cavity and are connected to the gas sensing unit. The flexible printed wiring board 5 includes: a base film 51 including a through hole 51a; a plurality of connection terminals 31 provided on the base film; and a metal mesh portion 53 provided on the base film to cover the through hole and insulated from the connection terminals. The pads 24 and the connection terminals 31 are electrically connected to each other with the gas sensing unit 23 positioned in a region 5a in which the metal mesh portion is formed (see FIGS. 8A and 8B).

Figure 8B:
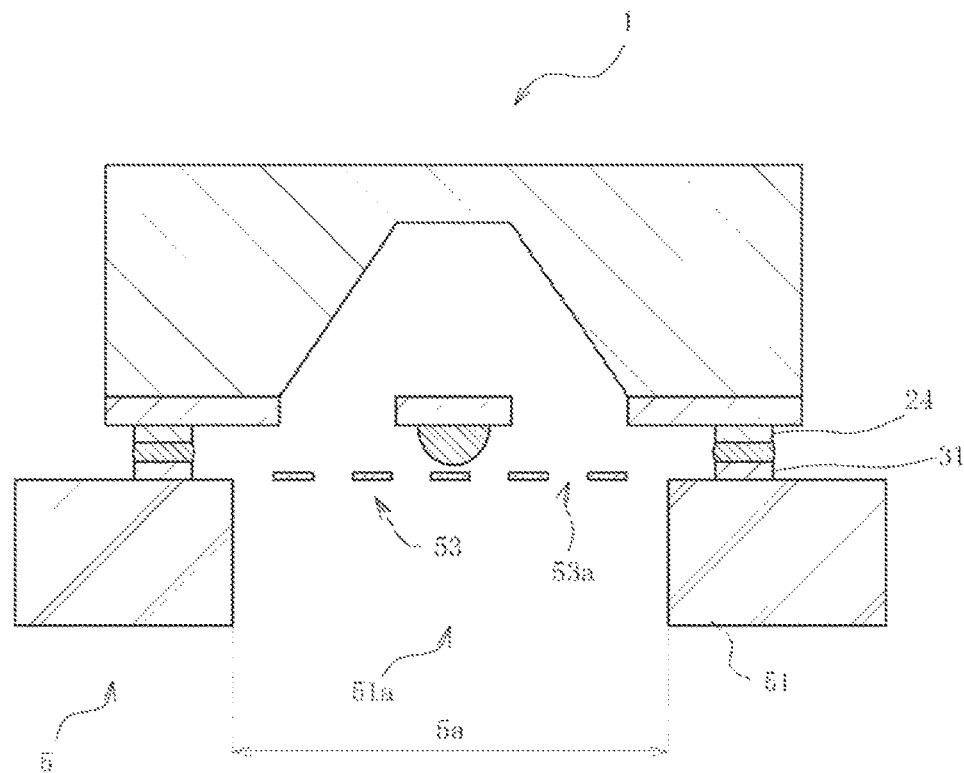
FIG. 8B is a schematic cross-sectional view illustrating an example of a MEMS gas sensor mount body.
Figure 9:
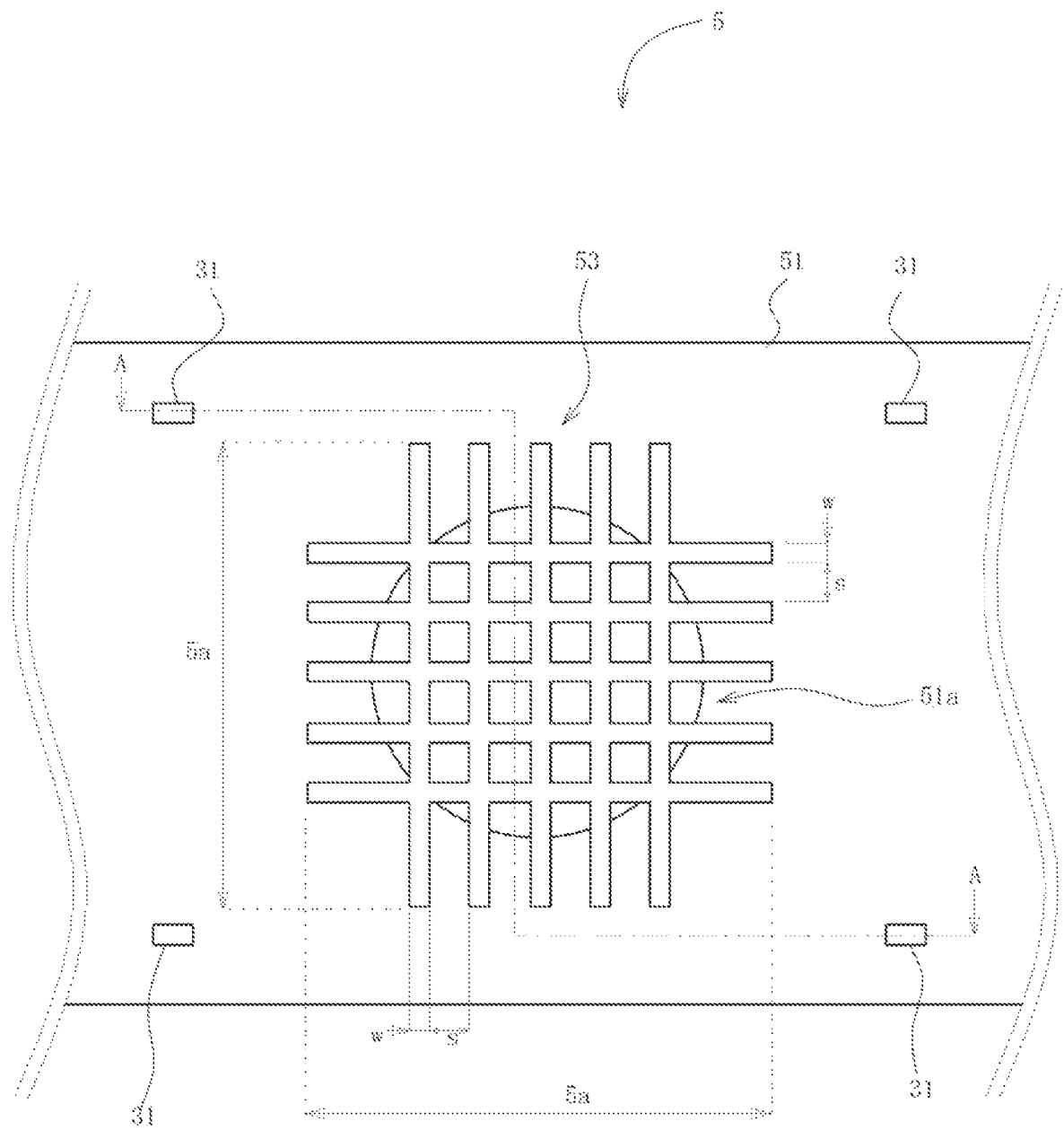
FIG. 9 is a schematic plan view illustrating an example of a flexible printed wiring board.
Figure 10A:
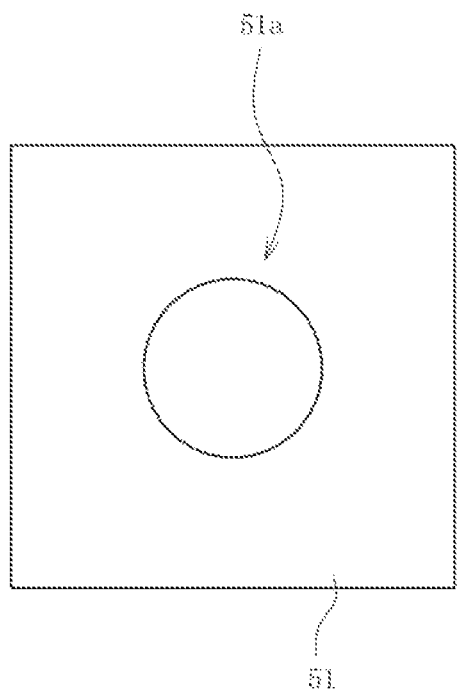
FIGS. 10A, 10B, 10C and 10D are schematic plan views illustrating an example of the shape of a through hole formed in the flexible printed wiring board.
Figure 10C:
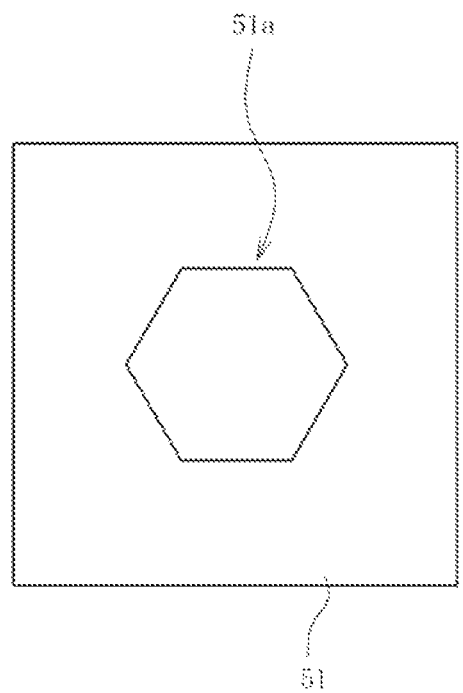
Figure 10B:
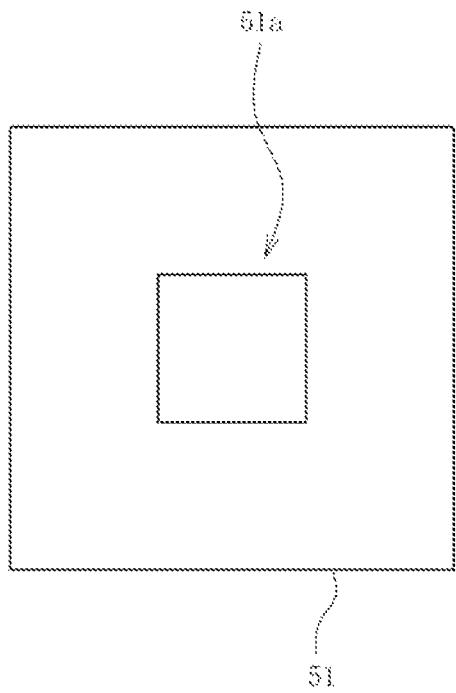
Figure 10D:
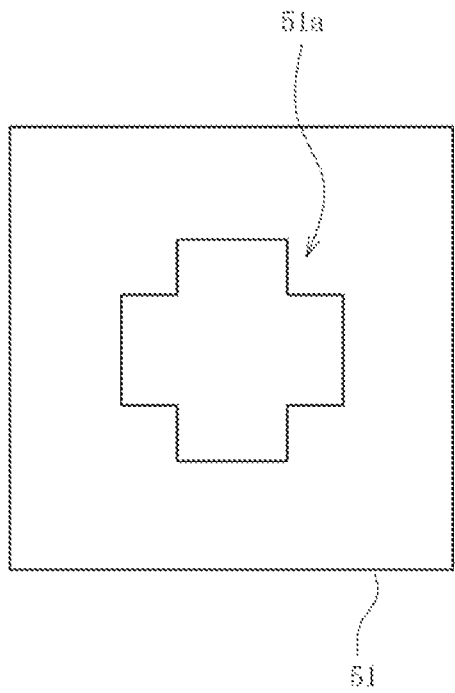

The flexible printed wiring board 5 includes a base film 51, a plurality of connection terminals 31, and a metal mesh portion 53 (see FIGS. 8B and 9). Examples of a material usable for the base film 51 include polyimide, polyethylene terephthalate, liquid crystal polymer (LCP), cycloolefin polymer (COP), epoxy resin, Teflon (trademark), and the like. The base film 51 includes a through hole 51a. The through hole 51a can be formed using a method such as a photolithography, removal using laser or the like, dry etching, wet etching, or the like for example. According to a particularly preferable method, a photosensitive polyimide resin is preferably used for the base film 51 and the through hole 51*a* is preferably formed by photolithography. This is because multiple holes can be formed with high accuracy at once with such a method. The thickness of the base film 51 may be, for example, 5 to 500 μm. There may be one or a plurality of through holes 51*a*. In a case where one through hole 51*a* is provided, the shape of the through hole in plan view may be a circle, polygon, cross, or the like for example (see FIGS. 10A to 10D). The size of the through hole 51*a* may be the same as or larger/smaller than the size of the cavity 21*a* in plan view.

The metal mesh portion 53 is provided on the base film 51 to cover the through hole 51*a* (see FIG. 9). Thus, in plan view, the metal mesh formed region 5*a* is larger than the through hole 51*a*. The metal mesh portion 53 is electrically insulated from the connection terminals 31 (see FIG. 9). Examples of materials usable for the metal mesh portion 53 include copper, gold, aluminum, platinum, palladium, nickel, titanium, stainless steel (SUS), and the like. The metal mesh portion 53 can be formed using a method such as etching, photolithography, plating, lift-off, and metal paste printing, for example. A width w of lines of the metal mesh portion 53 (see FIG. 9) may be, for example, 5 to 100 μm. The spacing s (see FIG. 9) between lines of the metal mesh portion 53 may be, for example, 5 to 100 μm. The thickness of the metal mesh portion 53 may be 0.5 to 50 μm, for example. Note that any one of the formation of the metal mesh portion 53 and the formation of the through hole 51*a* in the base film 51 may be implemented earlier than the other.

The material of the connection terminal 31 is preferably the same material as the metal mesh portion 53, because this enables the connection terminal 31 and the metal mesh portion 53 to be formed at once. Note that a material different from that of the metal mesh portion 53 may be used.

When being mounted on the flexible printed wiring board 5, the MEMS gas sensor chip 2 is disposed to have the gas sensing unit 23 of the MEMS gas sensor chip 2 positioned in the metal mesh formed region 5*a* of the flexible printed wiring board 5 (see FIG. 8B). Then, the pads 24 and the connection terminals 31 are electrically connected to each other.

According to the MEMS gas sensor mount body 1 of the present disclosure, the metal mesh portion 53 formed in the flexible printed wiring board 5 can prevent debris, oil, and the like from adhering to the gas sensitive material 23*a*.

In the embodiment described above, the base film 51 of the flexible printed wiring board 5 is a single layer, but the film may comprise two layers. For example, in FIG. 11, two base films 51 and 51 are bonded together, and a single through hole 51*a* is formed through the two base films 51 and 51. The connection terminals 31 are formed on the base film 51 on the upper side, and the metal mesh portion 53 is formed on the base film 51 on the lower side. In the configuration illustrated in FIG. 11, the position of the metal mesh portion 53 is lower than that of the metal mesh portion 53 in the configuration illustrated in FIG. 8B.

Figure 11:
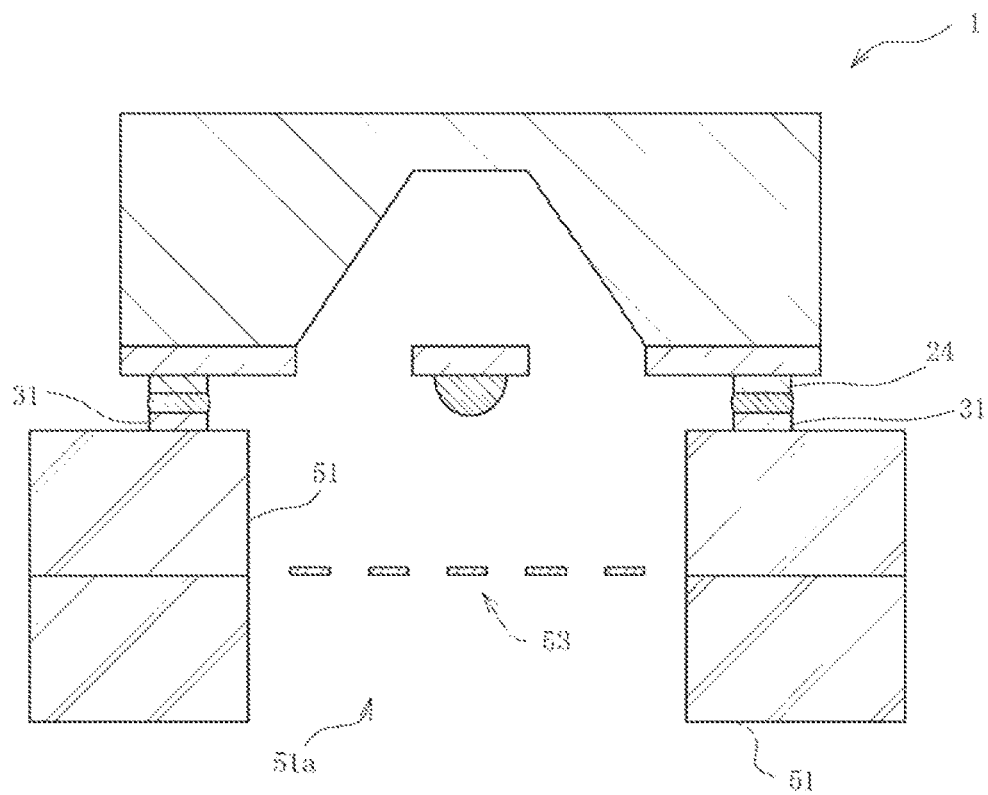
FIG. 11 is a schematic cross-sectional view illustrating another example of the MEMS gas sensor mount body.
Figure 12:
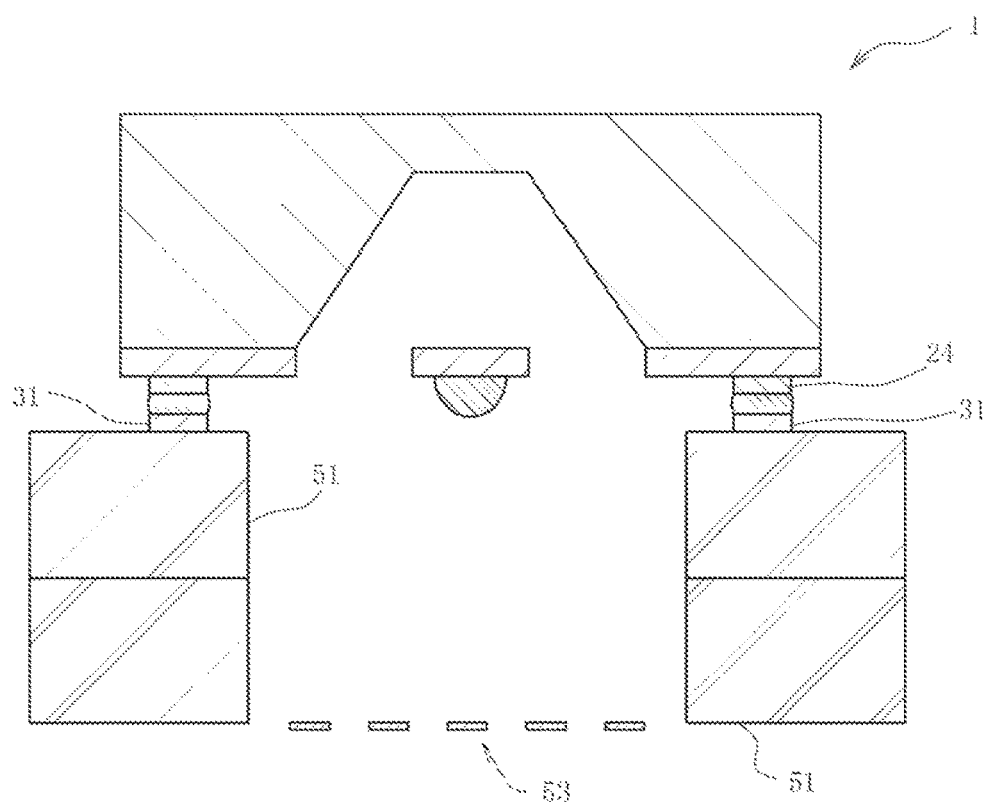
FIG. 12 is a schematic cross-sectional view illustrating another example of the MEMS gas sensor mount body.

The position of the metal mesh portion 53 may even be lower than the position illustrated in FIG. 11 (see FIG. 12). In this case, the connection terminals 31 are formed on the base film 51 on the upper side, and the metal mesh portion 53 is formed on the base film 51 on the lower side. When the base film 51 comprises a single layer, the metal mesh portion 53 may be formed on the surface of the base film 51 opposite to the surface on which the MEMS gas sensor chip 2 is mounted, as illustrated in FIG. 14, for example.

Figure 13:
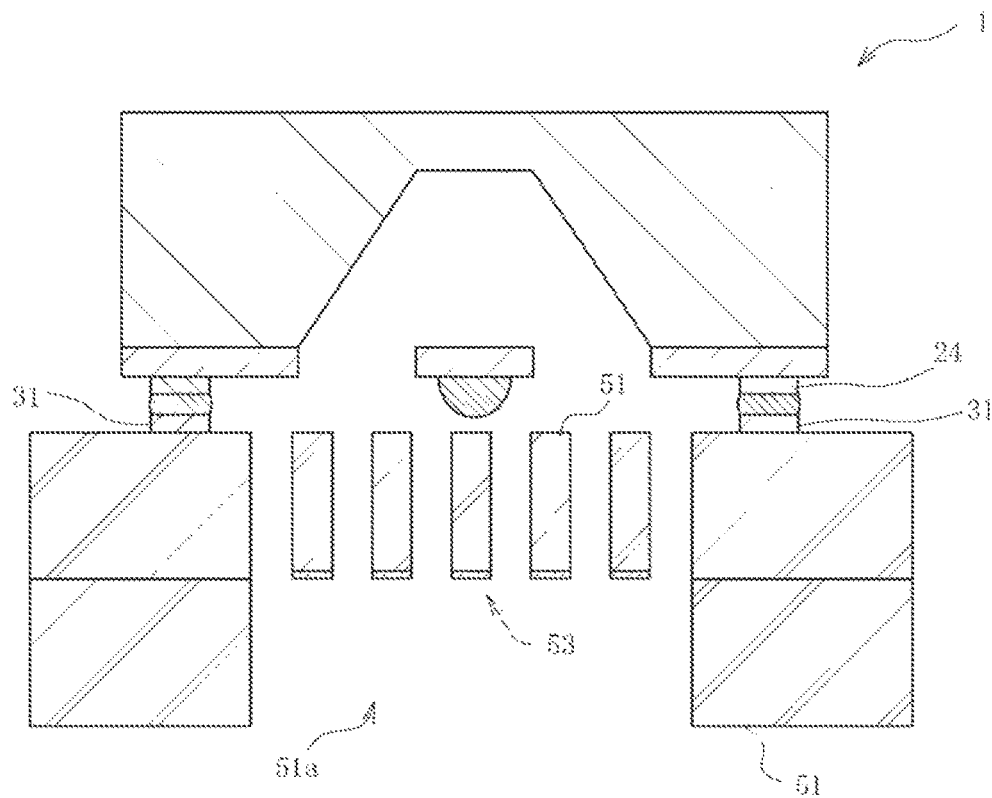
FIG. 13 is a schematic cross-sectional view illustrating another example of the MEMS gas sensor mount body.
Figure 14:
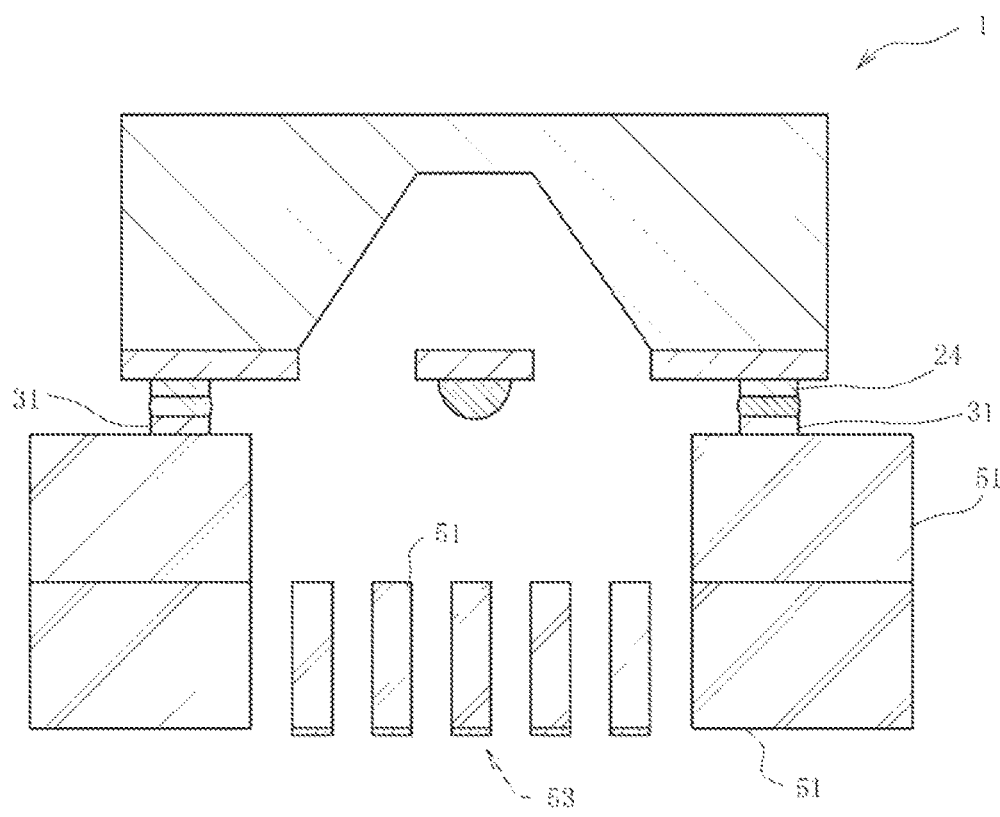
FIG. 14 is a schematic cross-sectional view illustrating another example of the MEMS gas sensor mount body.
Figure 15:
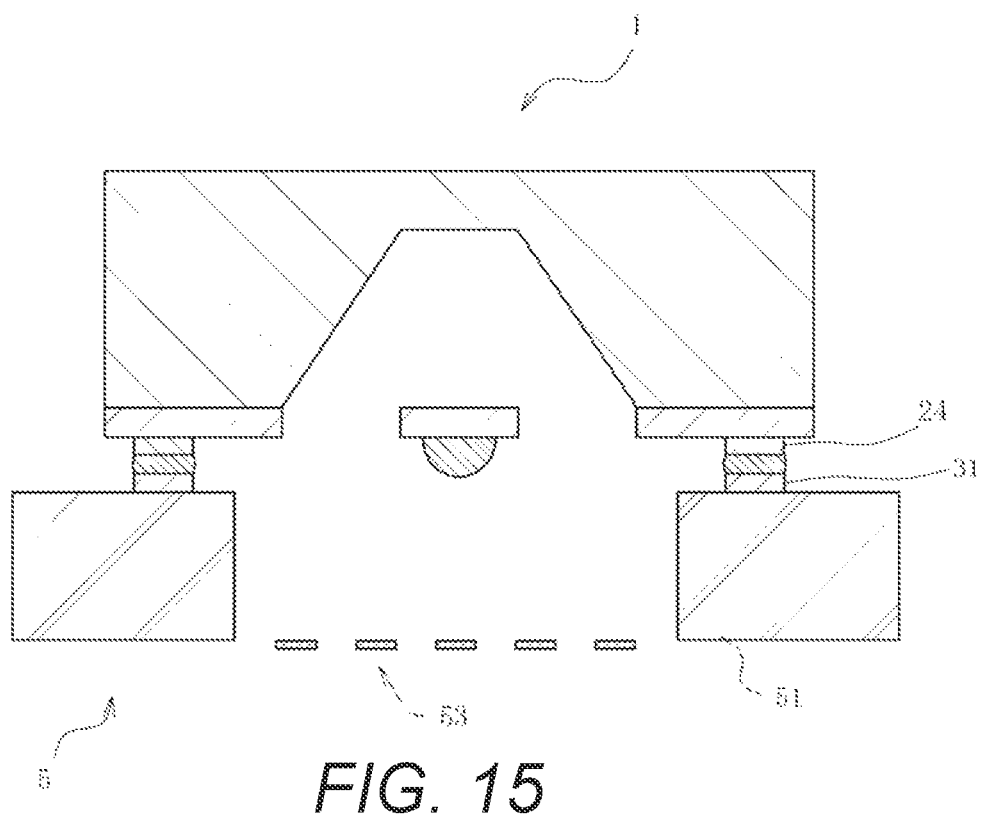
FIG. 15 is a schematic cross-sectional view illustrating another example of the MEMS gas sensor mount body.

In the configuration in which the two base films are bonded together (FIGS. 11 and 12), the base film 51 may be provided on one side of the metal mesh portion 53 without closing the through hole 51*a* (see FIGS. 13 and 14). In FIG. 13, the base film 51 on the upper side is provided on the metal mesh portion 53 without closing the through hole 51*a*. The base film 51 on the lower side has a part corresponding to the shape of the through hole 51*a* removed. Specifically, the base film 51 on the upper side is formed to be in the same shape as the metal mesh portion 53 in the region where the through hole 51*a* is formed. In FIG. 14, the base film 51 on the lower side is provided on the metal mesh portion 53 without closing the through hole Sla. The base film 51 on the upper side has a part corresponding to the shape of the through hole 51*a* removed. Specifically, the base film 51 on the lower side is formed to be in the same shape as the metal mesh portion 53 in the region where the through hole 51*a* is formed. With such a configuration, the strength of the metal mesh portion 53 can be increased with the base film 51 provided on one side thereof. Note that in FIG. 13, while the base film 51 on the upper side is formed to be in the same shape as the metal mesh portion 53, the base film 51 on the lower side may alternatively be formed to be in the same shape as the metal mesh portion 53.

With the configurations illustrated in FIGS. 11 to 15, a large space can be secured around the gas sensing unit 23, to facilitate the passage of the gas to be detected. Thus, detection sensitivity can be improved.

Figure 16:
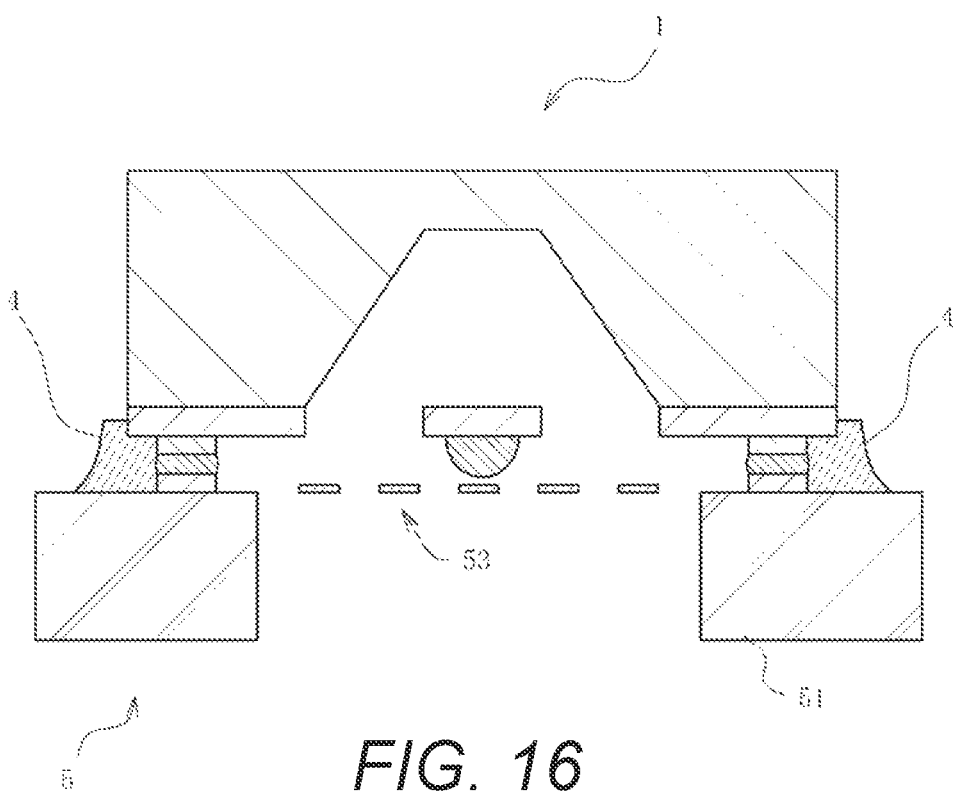
FIG. 16 is a schematic cross-sectional view illustrating another example of the MEMS gas sensor mount body.

Furthermore, the periphery of the connection portion between the pads 24 of the MEMS gas sensor chip 2 and the connection terminals 31 of the flexible printed wiring board 5 may be sealed by the resin 4 (see FIG. 16). With such a configuration, the MEMS gas sensor chip 2 can be firmly fixed to the flexible printed wiring board 5.

Figure 17A:
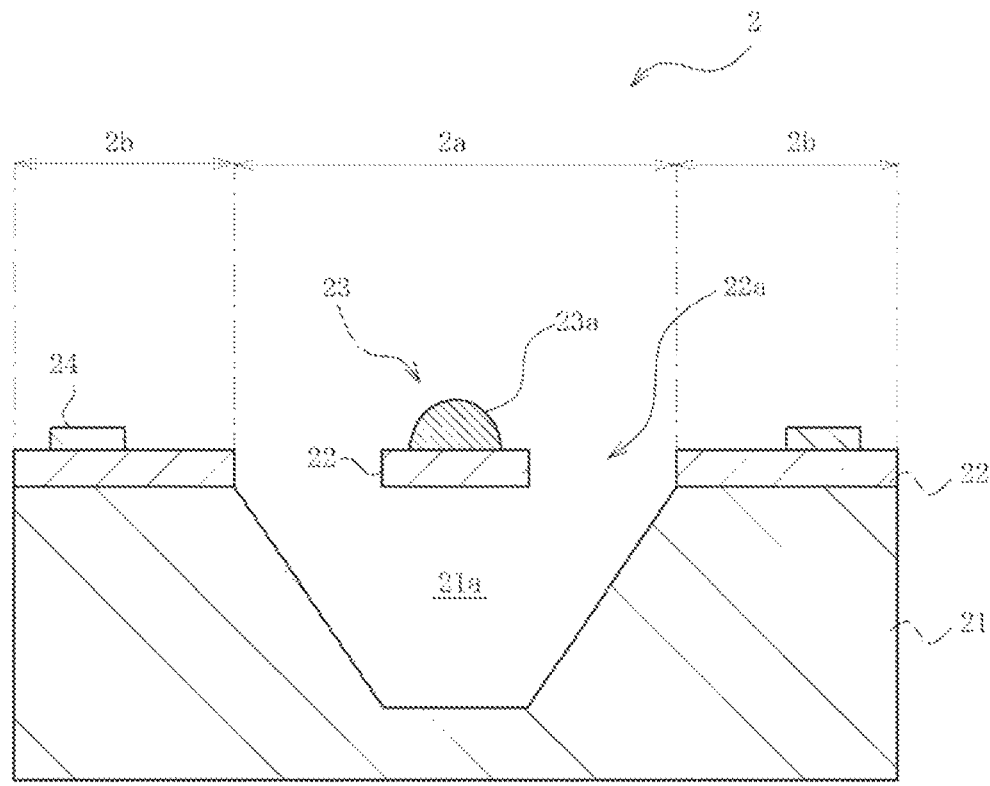
FIG. 17A is a schematic cross-sectional view illustrating an example of a MEMS gas sensor chip (A-A cross sectional view of FIG. 3).

A MEMS gas sensor mount body 1 of the present disclosure includes a MEMS gas sensor chip 2 and a mount substrate 3. The MEMS gas sensor chip 2 includes: a base 21 having a cavity 21*a*, an insulating film 22 that is provided to cover the cavity and has an opening portion 22*a* connected to the cavity; a gas sensing unit 23 positioned above the cavity; and a plurality of pads 24 that are positioned in a region 2*b* on the insulating film not above the cavity and are connected to the gas sensing unit. The mount substrate 3 includes a plurality of connection terminals 31 and at least one groove 62. The pads 24 and the connection terminals 31 are electrically connected to each other with the cavity 21*a* and the groove 62 overlapping in plan view (see FIGS. 17A and 17B).

Figure 17B:
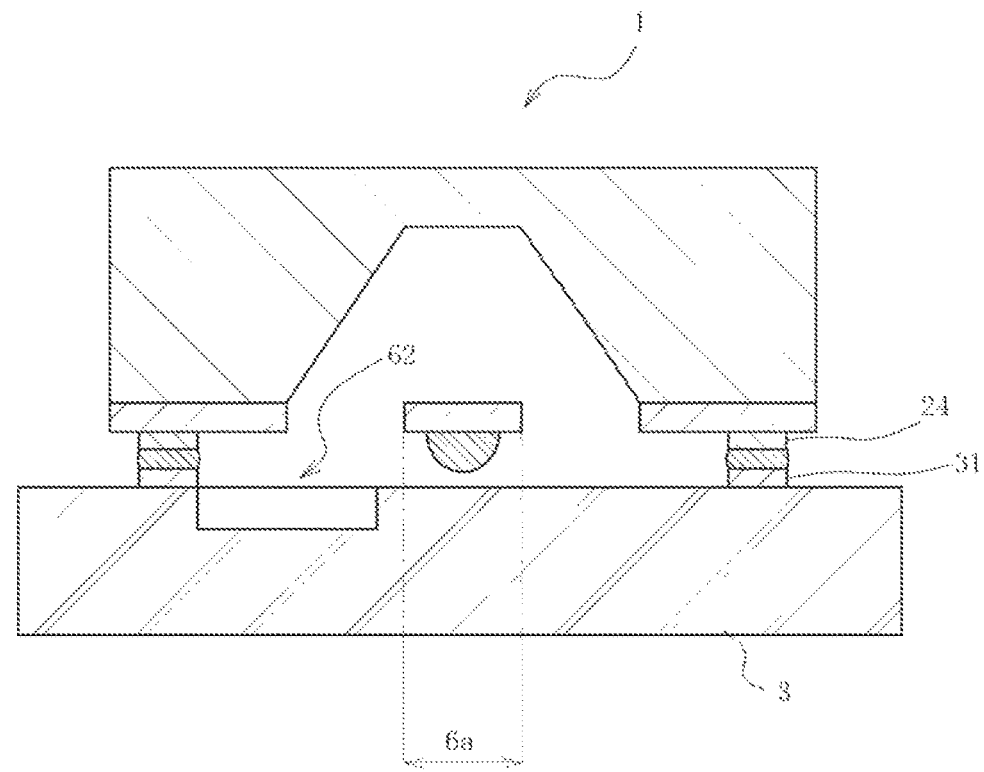
FIG. 17B is a schematic cross-sectional view illustrating an example of a MEMS gas sensor mount body (A-A cross-sectional view of FIG. 18A).
Figure 18A:
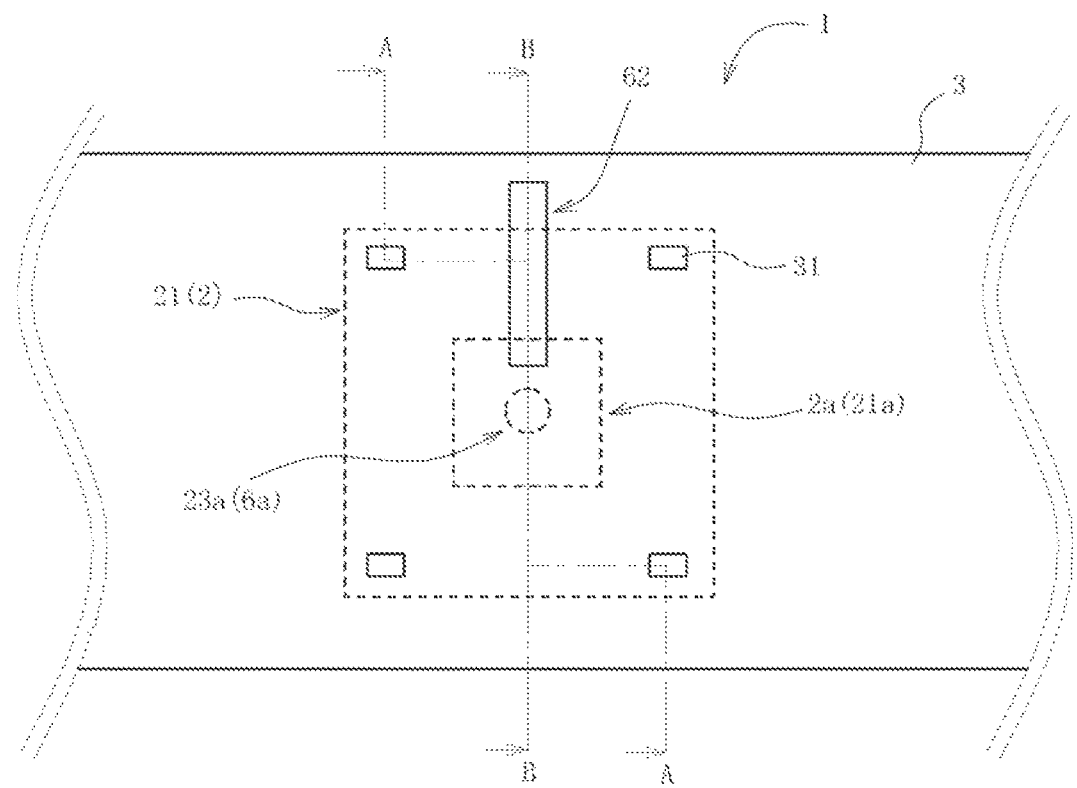
FIG. 18A is a schematic plan view illustrating an example of a MEMS gas sensor mount body.
Figure 18B:
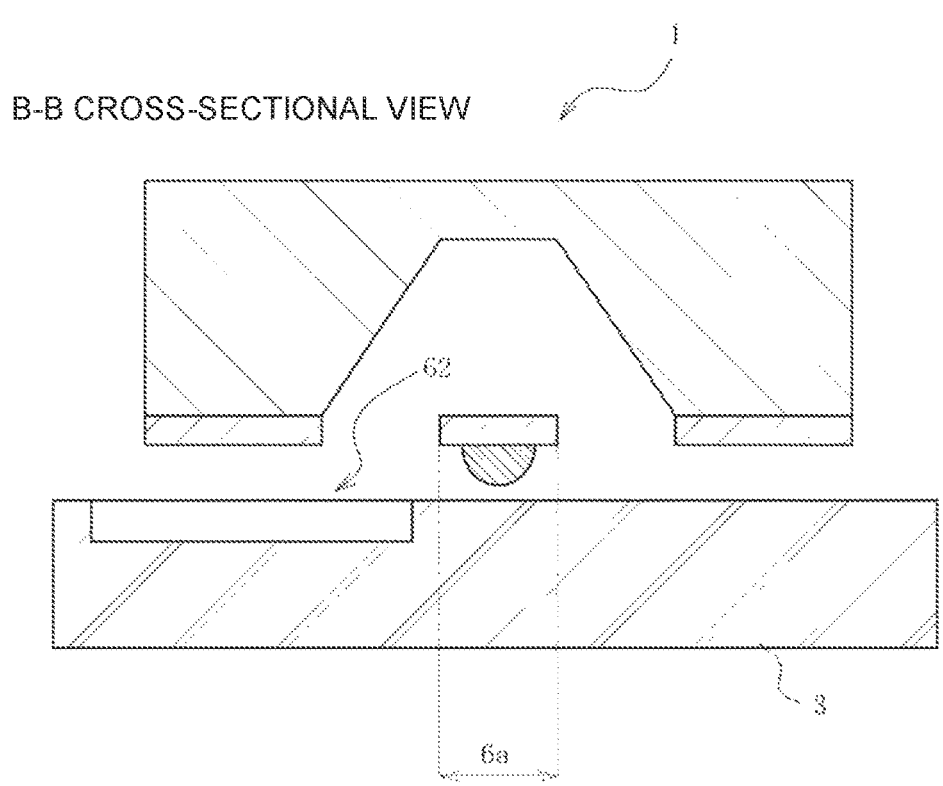
FIG. 18B is a B-B cross-sectional view of FIG. 18A.
Figure 19A:
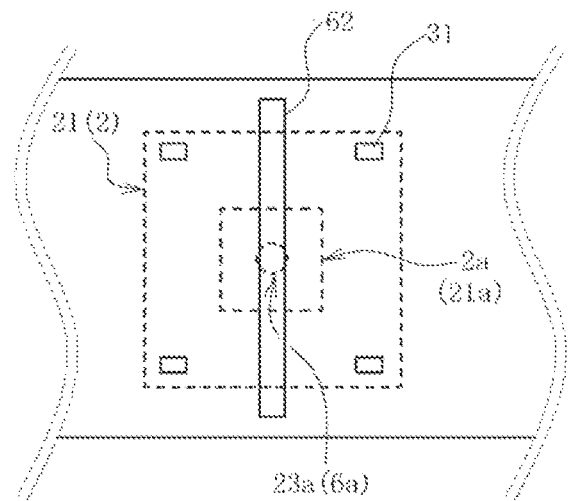
FIGS. 19A, 19B, 19C, 19D, 19E and 19F are schematic plan views illustrating an example of the shape of a groove formed in a mount substrate.
Figure 19B:
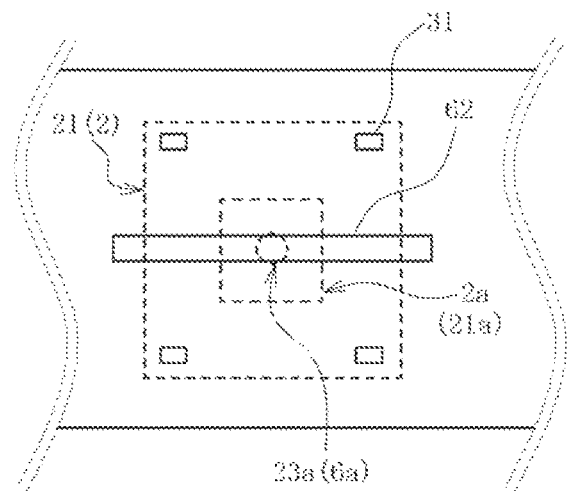
Figure 19C:
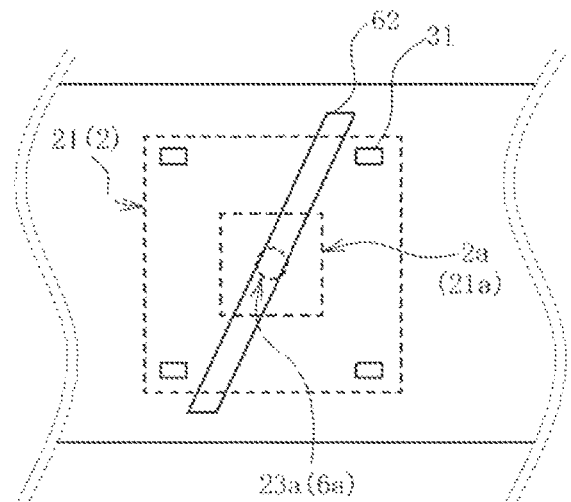
Figure 19D:
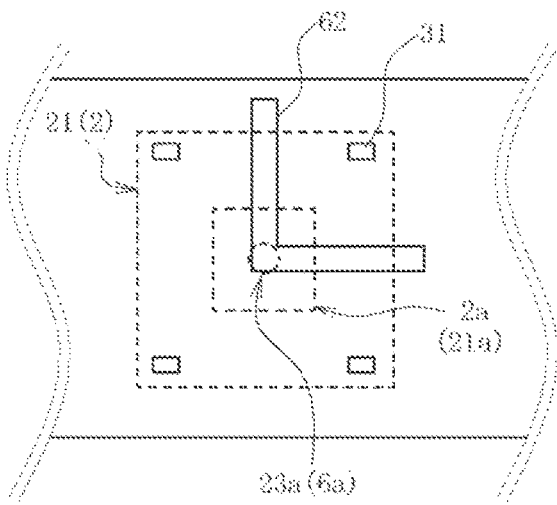
Figure 19E:
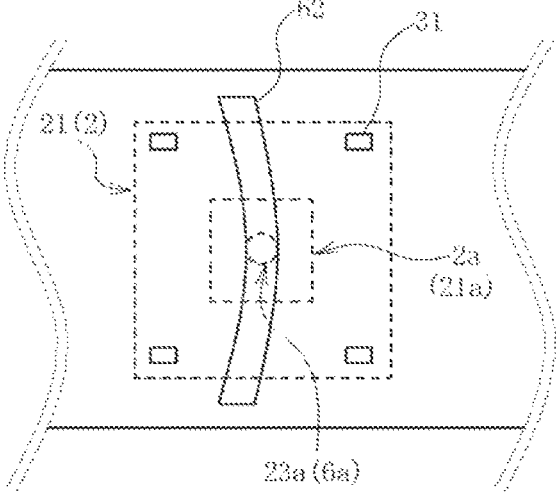
Figure 19F:
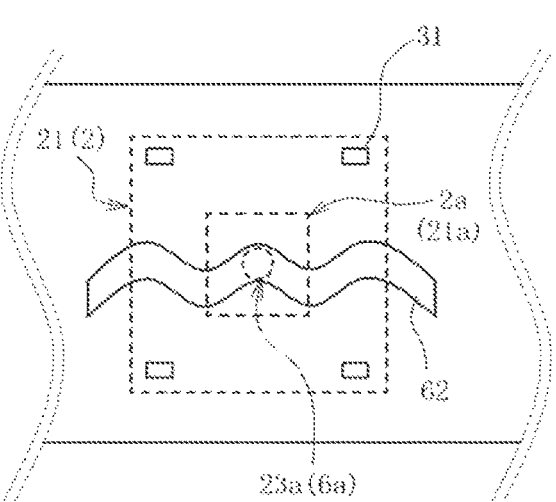
Figure 20A:
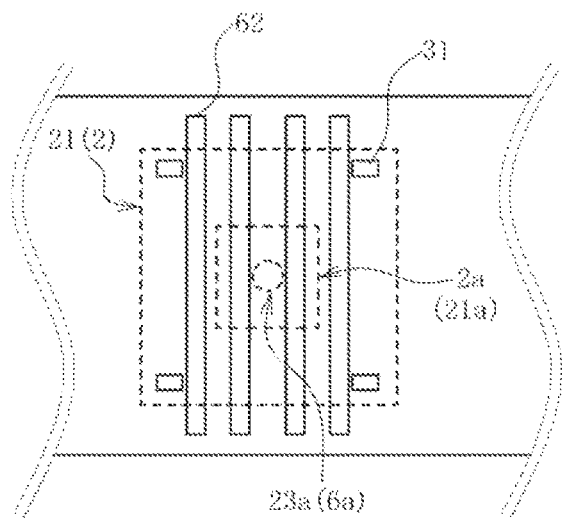
FIGS. 20A, 20B, 20C, 20D and 20E are schematic plan views illustrating another example of the shape of a groove formed in the mount substrate.
Figure 20D:
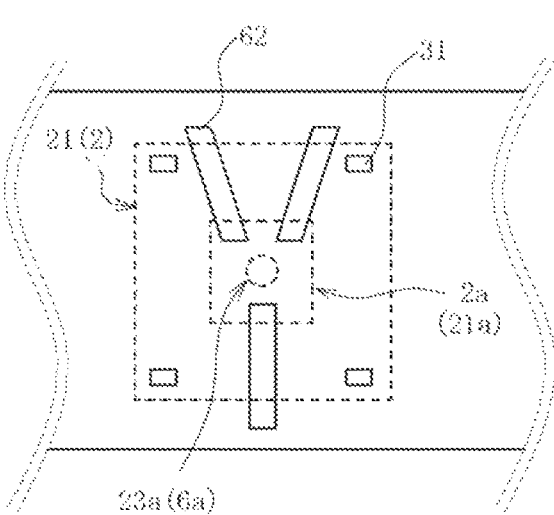
Figure 20B:
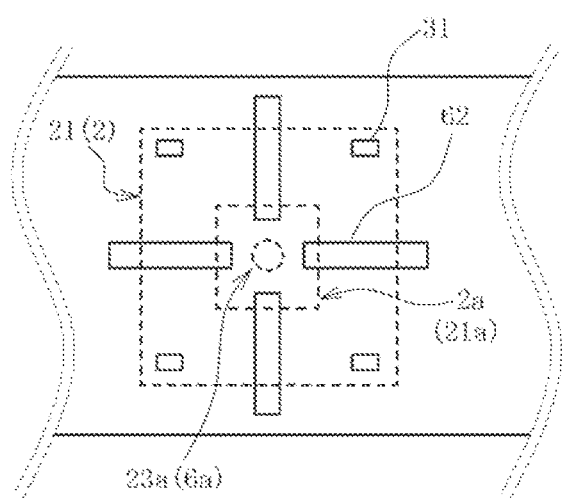
Figure 20E:
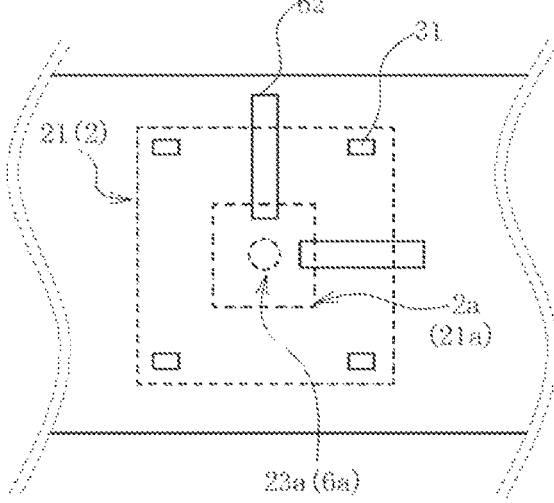
Figure 20C:
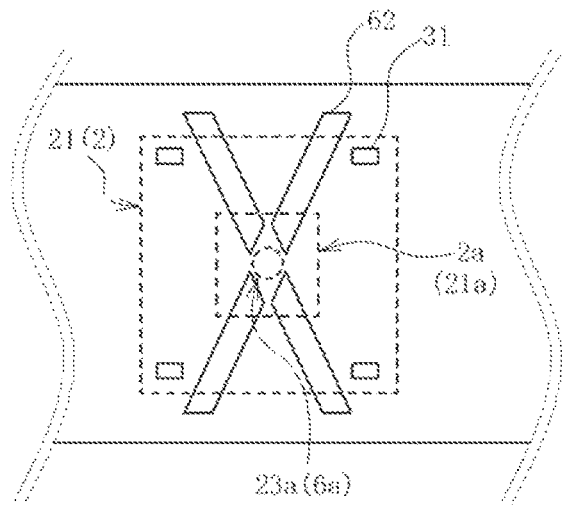
Figure 21A:
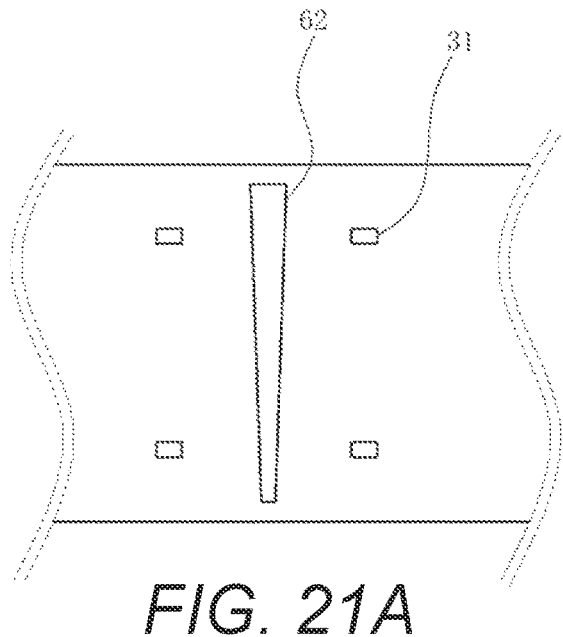
FIGS. 21A. 21B, 21C and 21D are schematic plan views illustrating another example of the shape of a groove formed in the mount substrate.
Figure 21C:
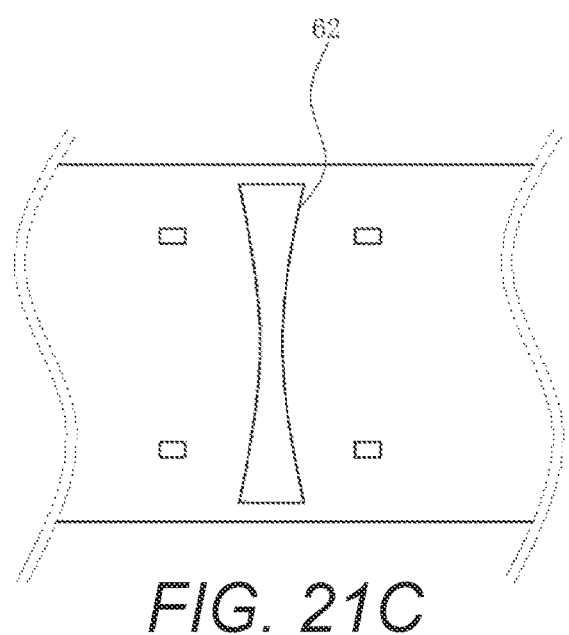
Figure 21B:
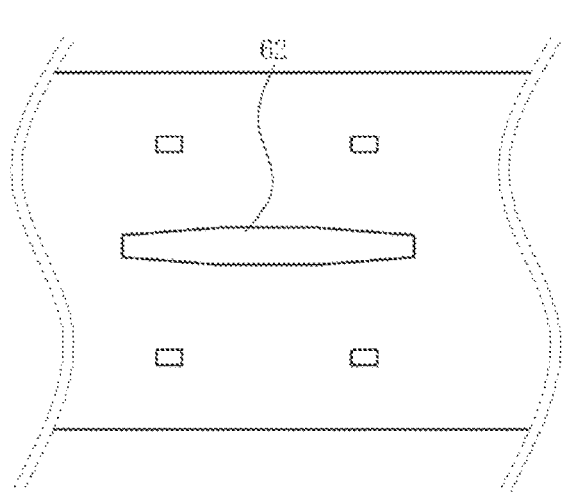
Figure 21D:
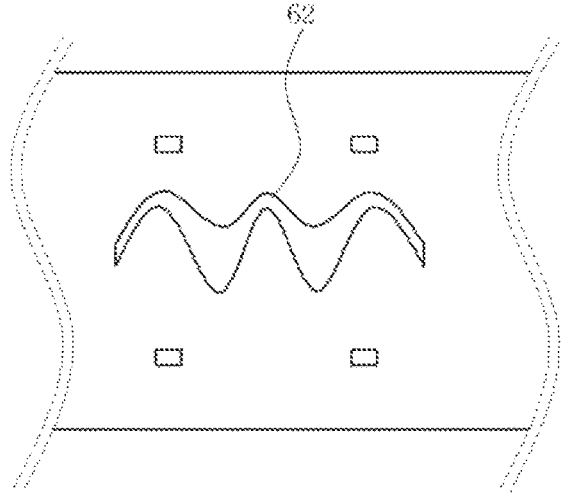

The mount substrate 3 includes a plurality of connection terminals 31 and at least one groove 62 (see FIGS. 17B, 18A and 18B). A printed circuit board can be used as the mount substrate 3, for example. Examples of the type of substrates usable for the printed circuit board include a paper phenol substrate, an epoxy substrate, a glass composite substrate, a glass epoxy substrate, a glass polyimide substrate, a fluorine substrate, a glass PPO substrate, a metal substrate, a ceramic substrate, and the like. The grooves 62 can be formed, for example, using an endmill. There may be one or a plurality of grooves 62. When there is one groove, the shape of the groove in plan view may be, for example, a linear shape (see FIGS. 19A to 19C), an L-shape (see FIG. 19D), a curved shape (see FIG. 19E), a wave shape (see FIG. 19F), and the like. When there are a plurality of grooves, the grooves may be arranged in plan view in such a manner that, for example, a plurality of linear grooves are arranged in parallel (see FIG. 20A), or two or more linear grooves are arranged about a region 6a where the gas sensing unit is positioned for example (FIGS. 20B to 20E). Note that, in FIGS. 19A to 19F, both ends of the groove 62 protrude beyond the outer circumference of the MEMS gas sensor chip 2. Alternatively, at least one end of the groove may extend beyond the outer circumference, or none of the ends may extend beyond the outer circumference. In FIG. 20A, both ends of all of the grooves protrude beyond the outer circumference of the MEMS gas sensor chip 2. Alternatively, one or both ends of at least one groove may extend beyond the outer circumference. In FIGS. 20B to 20E, one ends of all of the grooves protrude beyond the outer circumference of the MEMS gas sensor chip 2. Alternatively, one end of at least one groove may extend beyond the outer circumference.

Figure 22A:
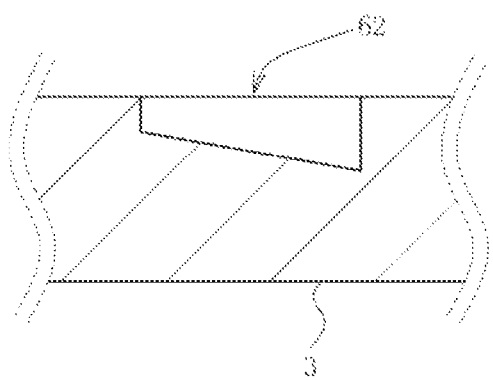
FIGS. 22A, 22B, 22C, 22D and 22E are schematic cross-sectional views illustrating another example of the shape of a groove formed in the mount substrate.
Figure 22D:
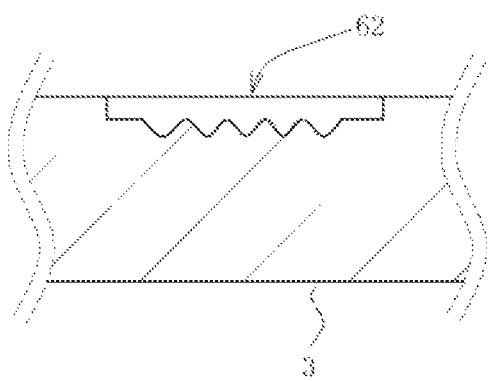
Figure 22B:
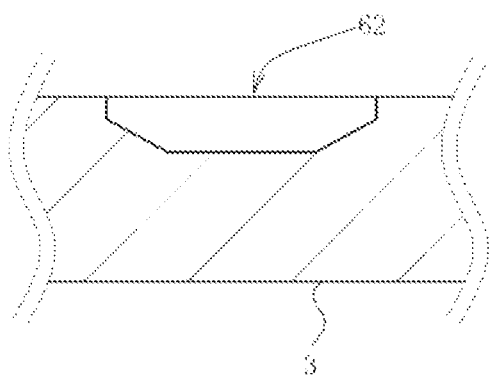
Figure 22E:
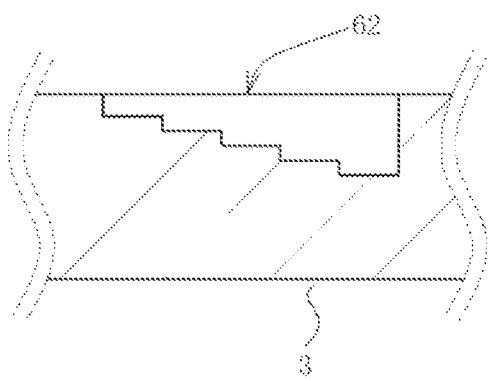
Figure 22C:
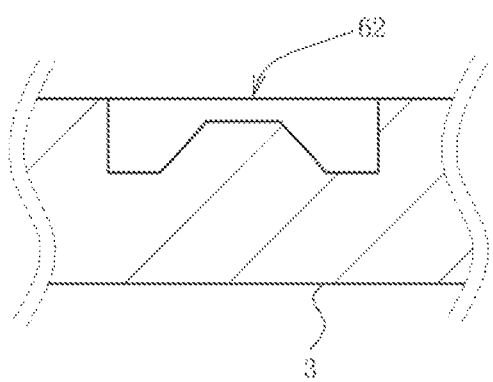

The grooves may have any width that may be, for example, 10 to 500 μm. When there is one groove, the width thereof may be uniform over the entire length of the groove (see FIGS. 19A to 19F) or may vary (see FIGS. 21A to 21D). When there are a plurality of grooves, the width of all the grooves may be uniform over the entire length, or may vary. Furthermore, a groove with a large width over the entire length and a groove with a small width over the entire length may both be included. Furthermore, a groove with a uniform width over the entire length and a groove with a width varying over the entire length may both be included. The grooves may have any depth that may be, for example, 5 to 200 μm. When there is one groove, the depth thereof may be uniform over the length of the groove or may vary (see FIGS. 22A to 22E). As illustrated in FIGS. 22A to 22C, a tapered groove may be provided. As illustrated in FIG. 22D, the bottom of the groove may have recesses and protrusions. As illustrated in FIG. 22E, the depth may vary to form a step shape. When there are a plurality of grooves, the depth of all the grooves may be uniform over the entire length, or may vary. Furthermore, a groove with a large depth over the entire length and a groove with a small depth over the entire length may both be included. Furthermore, a groove with a uniform depth over the entire length and a groove with a depth varying over the entire length may both be included.

When being mounted on the mount substrate 3, the MEMS gas sensor chip 2 is disposed so that the cavity 21a and the groove 62 overlap in plan view (see FIG. 18A). In other words, in plan view as in FIG. 18A, the MEMS gas sensor chip 2 is disposed on the mount substrate 3 so that the groove 62 is partially included in the region 2a above the cavity. Note that when the MEMS gas sensor chip 2 is disposed on the mount substrate 3, the gas sensitive material 23a may be positioned above the groove 62 (see FIGS. 19A to 19F), or the gas sensitive material 23a may not be positioned above the groove 62 (see FIGS. 20A to 20E). Then, the pads 24 and the connection terminals 31 are electrically connected to each other.

With the MEMS gas sensor mount body 1 of the present disclosure, even if the gap between the MEMS gas sensor chip 2 and the mount substrate 3 is small, the gas to be detected is easily introduced into the gas sensing unit 23 due to the groove 62 provided.

Figure 23A:
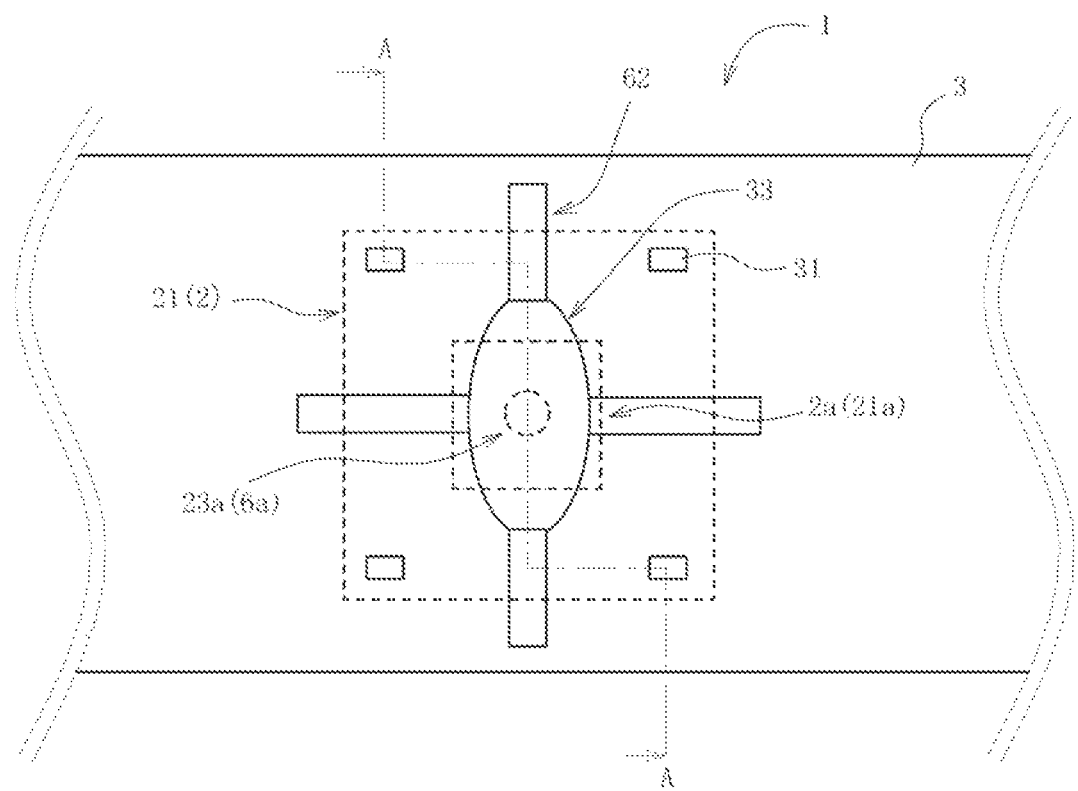
FIG. 23A is a schematic plan view illustrating another example of the MEMS gas sensor mount body.
Figure 23B:
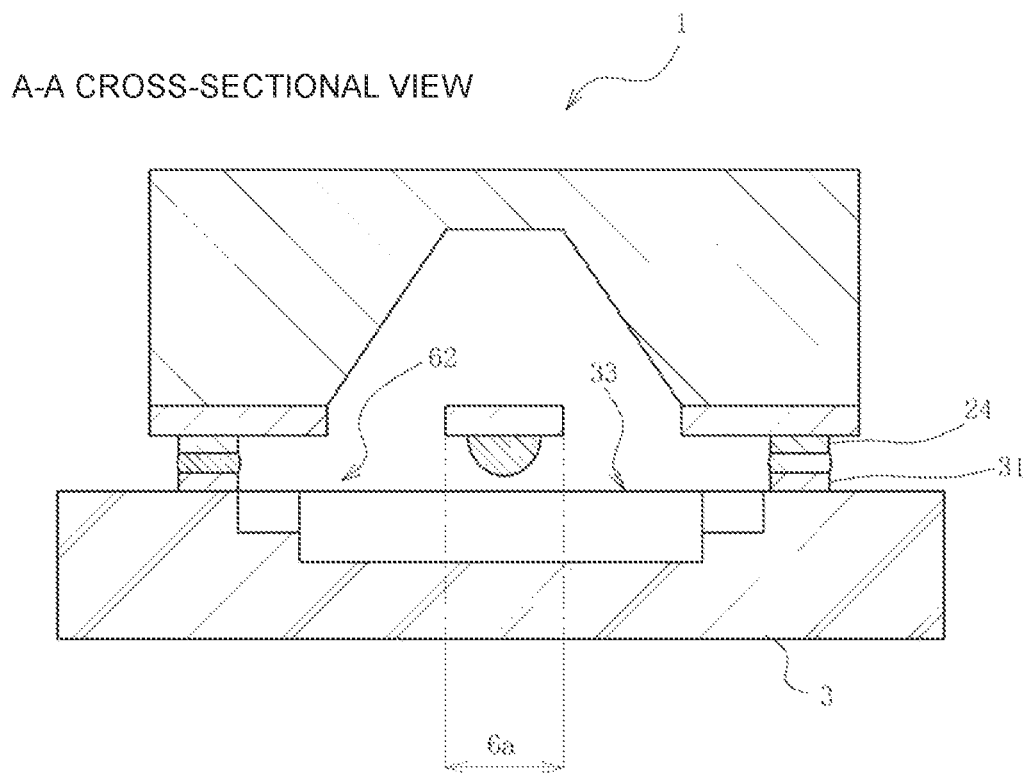
FIG. 23B is an A-A cross-sectional view of FIG. 23A.

In the embodiment described above, the mount substrate 3 includes the plurality of connection terminals 31 and at least one groove 62. Alternatively, the mount substrate 3 may further include a recessed portion 33 that is connected to the groove 62, in the region 6a where the gas sensing unit 23 is positioned (see FIGS. 23A and 23B). FIG. 23A is a schematic plan view of the MEMS gas sensor mount body 1. For convenience, the MEMS gas sensor chip 2 is indicated by a broken line. FIG. 23B is an A-A cross-sectional view of FIG. 23A. The recessed portion 33 is formed in the region 6a where the gas sensing unit 23 of the MEMS gas sensor chip 2 is positioned. Thus, the MEMS gas sensor chip 2 is mounted with the gas sensing unit 23 facing the recessed portion 33. The recessed portions 33 may have the same size as the gas sensing unit 23 or may have a different size as illustrated in FIGS. 23A and 23B.

Figure 24A:
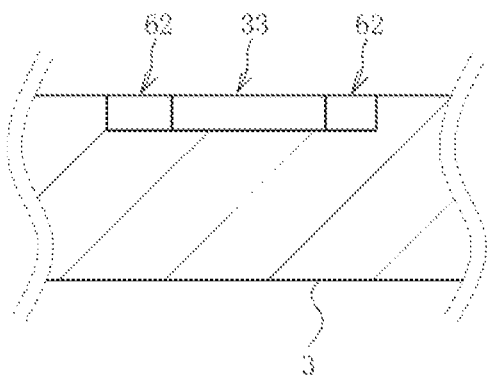
FIGS. 24A, 24B, 24C, 24D and 24E are schematic cross-sectional views illustrating another example of the shape of a groove and a recessed portion formed in the mount substrate.
Figure 24D:
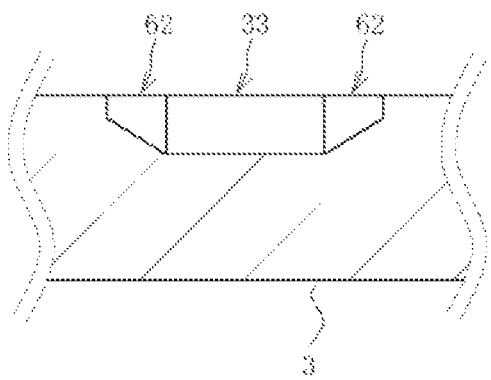
Figure 24B:
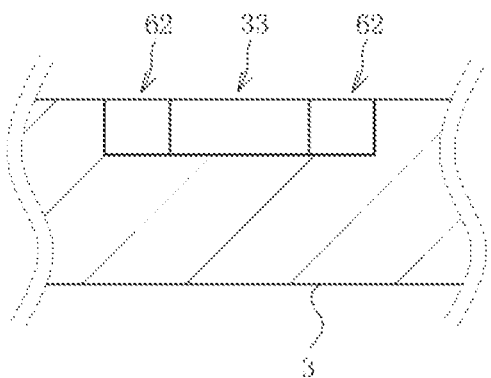
Figure 24E:
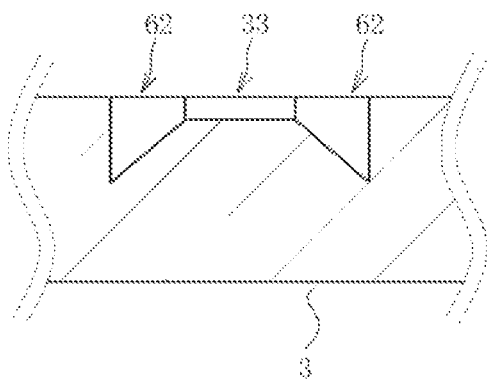
Figure 24C:
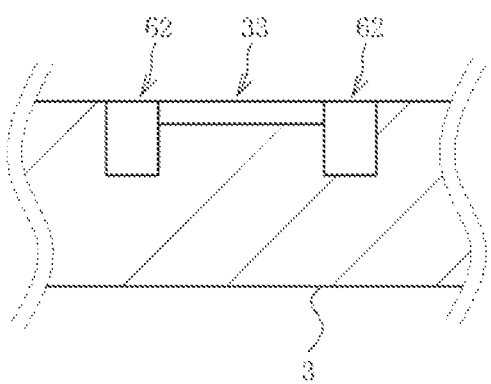

Because the recessed portion 33 is connected to the groove 62, gas to be detected can be more efficiently introduced into the recessed portion 33 below the gas sensing unit 23, from the outer circumference of the MEMS gas sensor chip 2 through the groove 62. The shape of the recessed portions 33 in plan view can be, for example, an elliptical shape as illustrated in FIG. 23A, a circular shape, a polygonal shape, or the like. The depths of the recessed portions 33 and the grooves 62 may be the same (see FIGS. 24A and 24B) or may be different from each other (see FIGS. 23B, 24C to 24E). In the MEMS gas sensor mount body 1 with such a configuration, the space below the gas sensing unit 23 can be secured by the recessed portion 33, so that a larger amount of gas to be detected can be introduced at or near the gas sensing unit 23.

In FIG. 23A, one ends of all of the grooves protrude beyond the outer circumference of the MEMS gas sensor chip 2. Alternatively, one end of at least one groove may extend beyond the outer circumference.

Figure 25A:
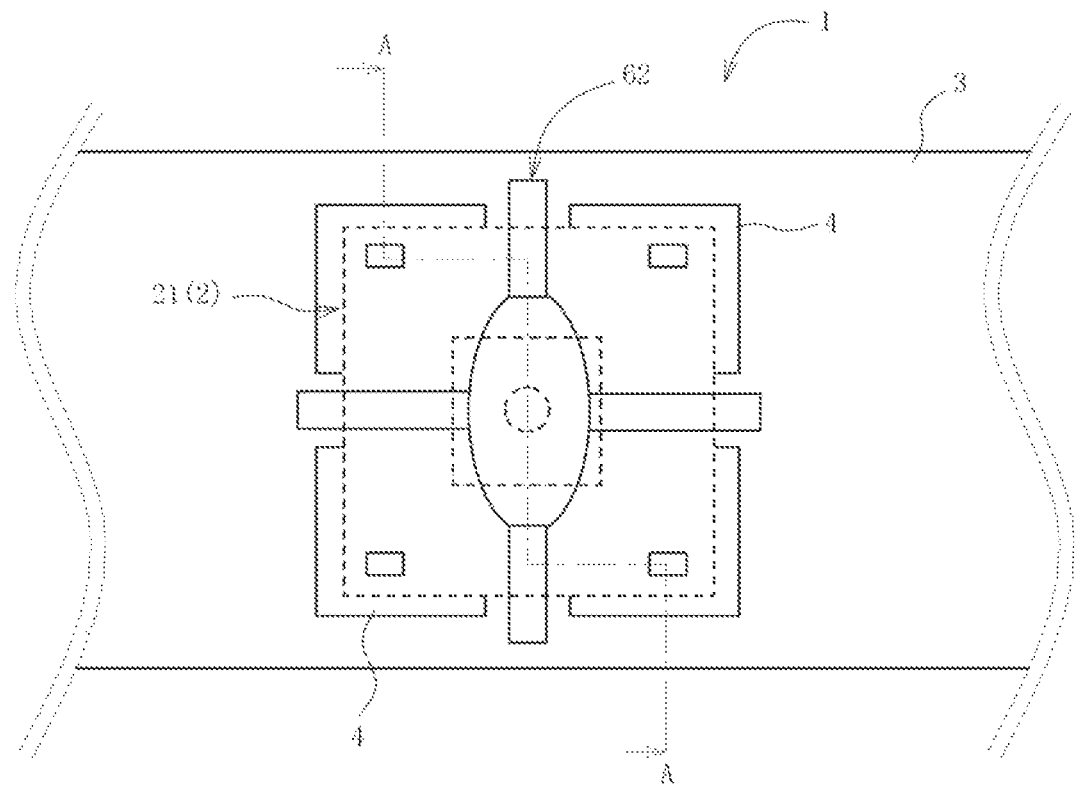
FIG. 25A is a schematic plan view illustrating another example of the MEMS gas sensor mount body.
Figure 25B:
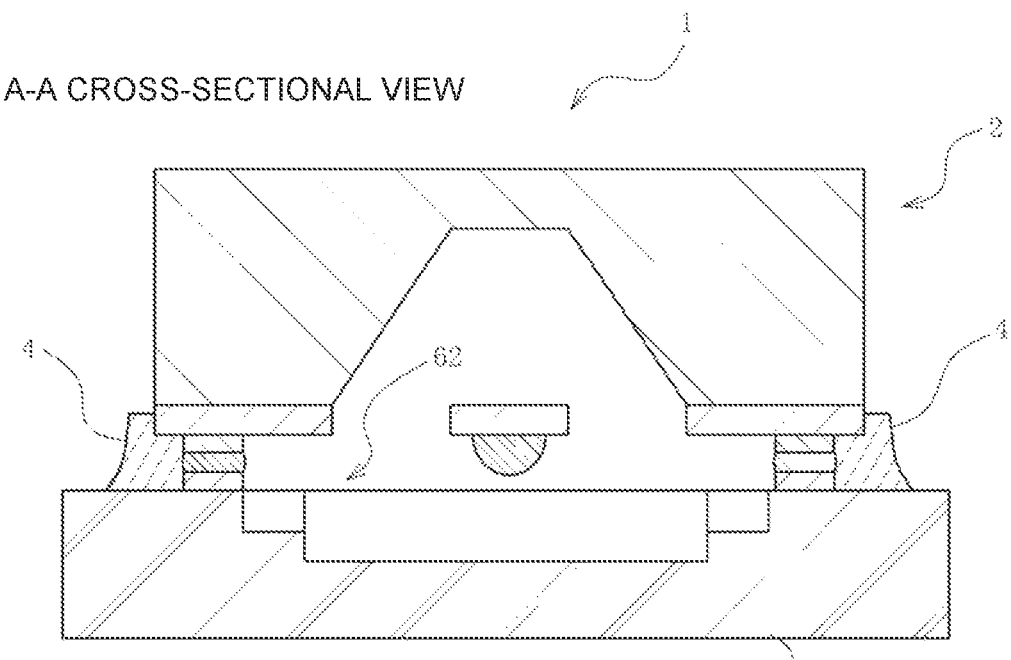
FIG. 25B is an A-A cross-sectional view of FIG. 25A.

The periphery of the connection portion between the pads 24 of the MEMS gas sensor chip 2 and the connection terminals 31 of the mount substrate 3 may be sealed by the resin 4 (see FIGS. 25A and 25B). Still, as illustrated in FIG. 25A, the resin 4 is provided without closing the grooves 62. The sealing using the resin 4 as illustrated in FIG. 25A is implemented also in a configuration in which one ends of all the grooves do not extend beyond the outer circumference of the MEMS gas sensor chip 2. With such a configuration, gas to be detected can be introduced into the recessed portion 33 through the groove 62.

A MEMS gas sensor mount body 1 of the present disclosure includes a MEMS gas sensor chip 2 and a printed circuit board. The MEMS gas sensor chip 2 includes: a base 21 having a cavity 21a; an insulating film 22 that is provided on the base 21 to cover the cavity 21a and has an opening portion 22a connected to the cavity 21a; a gas sensing unit 23a provided on a region 2a of the insulating film 22 above the cavity; and a plurality of pads 24 that are provided on a region 2b of the insulating film 22 not above the cavity and are connected to the gas sensing unit 23a. The printed circuit board includes a gas introduction path and a plurality of connection terminals 31. The MEMS gas sensor chip is mounted on the printed circuit board, with the cavity 21a and the gas introduction path overlapping in plan view, and with the plurality of pads 24 electrically connected to the plurality of connection terminals 31.

The printed circuit board includes the mount substrate 3 and the flexible printed wiring board 5. In one embodiment, the gas introduction path is the plurality of micropores 32 formed through the printed circuit board 3 (for example, see FIG. 1B). In another embodiment, the gas introduction path is an opening 53a of the metal mesh portion 53 in the region, of the base film 51 including the through hole 51a, where the through hole is formed (see, FIG. 8B for example). In yet another embodiment, the gas introduction path is at least one groove 62 formed in the printed circuit board 3 and having at least one end extending beyond the outer circumference of the base 21 (see, for example, FIG. 18A).

Figure 26A:
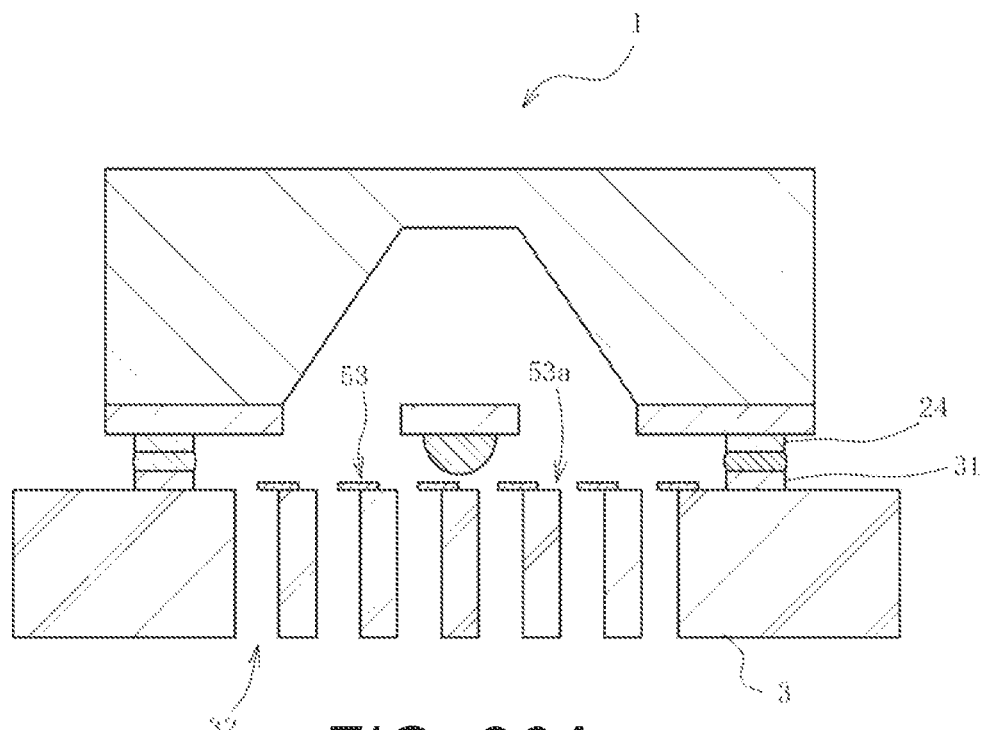
FIG. 26A is a schematic cross-sectional view illustrating an example of a MEMS gas sensor mount body (A-A cross-sectional view of FIG. 26B).
Figure 26B:
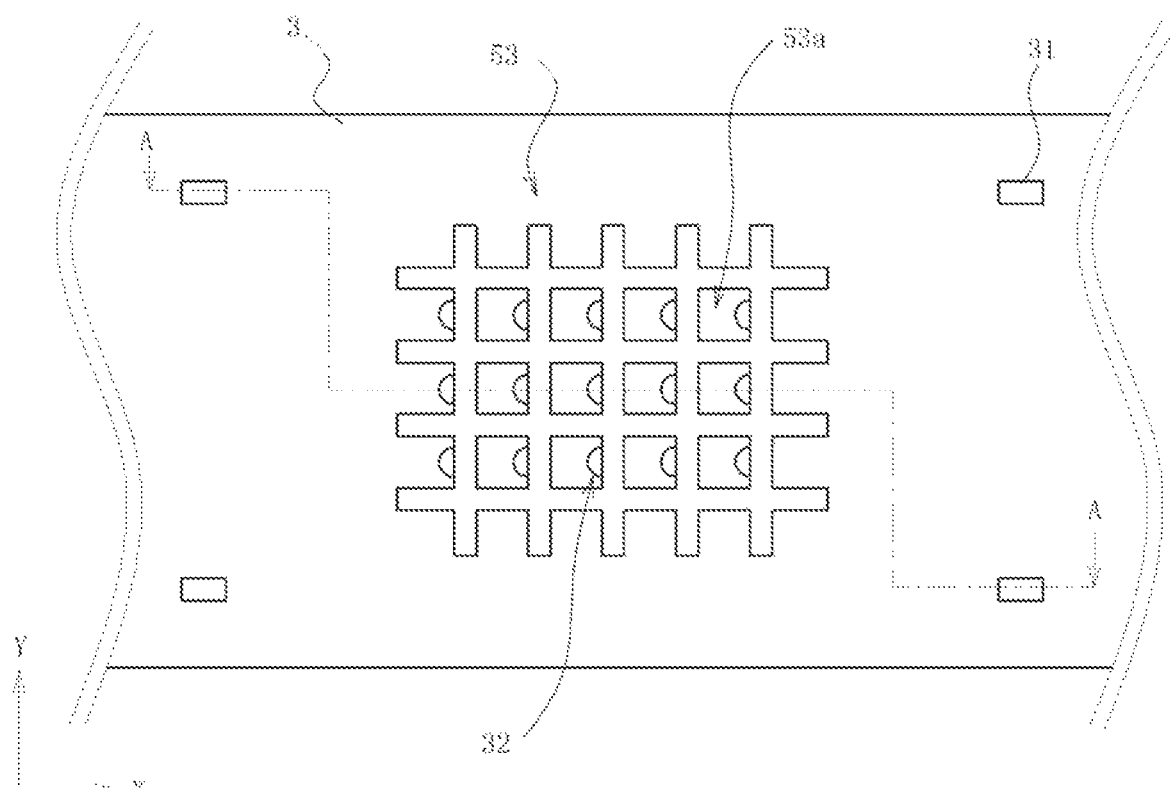
FIG. 26B is a schematic plan view illustrating an example of a printed circuit board.

Referring to FIGS. 26A and 26B, the printed circuit board 3 may further include the metal mesh portion 53 that is insulated from the plurality of connection terminals 31 and includes a plurality of metal wires provided on the printed circuit board 3, and the plurality of metal wires may partially cover the plurality of micropores 32. FIG. 26A is an A-A cross-sectional view of FIG. 26B. Note that in FIG. 26B, the MEMS gas sensor chip 2 is omitted for the sake of clarity. Referring to FIG. 26B, the plurality of micropores 32 formed in the printed circuit board 3 are partially covered only by the plurality of metal wires extending along the Y direction and arranged in the X direction.

The micropores 32 that are partially covered by the metal wires are smaller than the micropores 32 not covered by the metal wires, meaning that gas is less likely to pass through the former micropores 32. With this configuration, gas selectivity can be improved. For example, when the gas to be detected is acetone contained in skin gas, the acetone reaches the gas sensing unit earlier than miscellaneous gas included in the skin gas even if the micropores are partially covered, because the acetone is highly volatile and is highly diffusive.

Note that in FIGS. 26A and 26B, the metal mesh portion 53 is provided on the surface of the printed circuit board 3 on which the MEMS gas sensor chip 2 is mounted, but may also be provided on a surface opposite to the surface on which the MEMS gas sensor chip 2 is mounted. The plurality of micropores 32 may be partially covered by only a plurality of metal wires that extend in the X direction and are arranged in the Y direction. The plurality of micropores 32 may be partially covered by metal wires extending in the X direction and arranged in the Y direction and metal wires extending in the Y direction and arranged in the X direction. Furthermore, some of the plurality of micropores 32 may be partially covered. In other words, some of the plurality of micropores 32 may not be covered at all or completely covered by metal wires.

The invention claimed is:

1. A MEMS gas sensor mount body comprising:
   a MEMS gas sensor chip including:
      a base having a cavity;
      an insulating film that is provided on the base to cover the cavity and has an opening portion connected to the cavity;
      a gas sensing unit provided on a region of the insulating film above the cavity; and
      a plurality of pads that are provided on a region on the insulating film not above the cavity and are connected to the gas sensing unit; and
   a printed circuit board including:
      a gas introduction path; and
      a plurality of connection terminals,
   the MEMS gas sensor chip being mounted on the printed circuit board to cover the opening portion such that where the plurality of connection terminals are provided on the printed circuit board is coplanar with a portion of a main surface of the printed circuit board that overlaps the gas sensing unit as viewed in a direction perpendicular to the main surface, with the cavity and the gas introduction path overlapping as viewed in the direction perpendicular to the main surface, and with the plurality of pads electrically connected to the plurality of connection terminals, and
   the gas introduction path being at least one groove that is formed on the main surface of the printed circuit board in a region other than a region directly faced by the gas sensing unit such that the at least one groove has a bottom surface that is recessed relative to the main surface and such that the at least one groove does not overlap the gas sensing unit as viewed in the direction perpendicular to the main surface.

2. The MEMS gas sensor mount body according to claim 1, wherein
   the at least one groove having at least one end protruding beyond an outer circumference of the base.

3. The MEMS gas sensor mount body according to claim 2, wherein
   the printed circuit board includes a recessed portion in a region where the gas sensing unit is positioned, and another end portion of the at least one groove is connected to the recessed portion.

4. The MEMS gas sensor mount body according to claim 2, wherein
   peripheries of connection portions between the plurality of pads and the plurality of connection terminals are sealed by resin.

5. The MEMS gas sensor mount body according to claim 3, wherein
   peripheries of connection portions between the plurality of pads and the plurality of connection terminals are sealed by resin.

6. The MEMS gas sensor mount body according to claim 1, wherein
   peripheries of connection portions between the plurality of pads and the plurality of connection terminals are sealed by resin.

* * * * *